(12) United States Patent
Kong et al.

(10) Patent No.: US 12,458,629 B2
(45) Date of Patent: Nov. 4, 2025

(54) METHOD FOR TREATING NONSENSE MUTATION MEDIATED DUCHENNE MUSCULAR DYSTROPHY IN PEDIATRIC PATIENTS

(71) Applicant: PTC THERAPEUTICS, INC., South Plainfield, NJ (US)

(72) Inventors: Ronald Kong, River Edge, NJ (US); Joseph William McIntosh, Wyckoff, NJ (US)

(73) Assignee: PTC THERAPEUTICS, INC., South Plainfield, NJ (US)

( * ) Notice: Subject to any disclaimer, the term of this patent is extended or adjusted under 35 U.S.C. 154(b) by 848 days.

(21) Appl. No.: 17/602,576

(22) PCT Filed: Apr. 9, 2020

(86) PCT No.: PCT/US2020/027382
§ 371 (c)(1),
(2) Date: Oct. 8, 2021

(87) PCT Pub. No.: WO2020/210432
PCT Pub. Date: Oct. 15, 2020

(65) Prior Publication Data
US 2022/0175739 A1 Jun. 9, 2022

Related U.S. Application Data

(60) Provisional application No. 62/831,931, filed on Apr. 10, 2019.

(51) Int. Cl.
*A61K 31/4245* (2006.01)
*A61P 21/00* (2006.01)

(52) U.S. Cl.
CPC .......... *A61K 31/4245* (2013.01); *A61P 21/00* (2018.01)

(58) Field of Classification Search
CPC ....... A61K 31/4245; A61P 21/00; A61P 25/08
See application file for complete search history.

(56) References Cited

U.S. PATENT DOCUMENTS

| 9,289,398 | B2 | 3/2016 | Almstead et al. |
| 2014/0221458 | A1 | 8/2014 | De Kimpe et al. |
| 2016/0194630 | A1 | 7/2016 | Krainer et al. |
| 2019/0022167 | A1 | 1/2019 | Wilson et al. |

FOREIGN PATENT DOCUMENTS

| JP | A-2008-535846 | 9/2008 | |
| JP | A-2010-506840 | 3/2010 | |
| WO | WO 2006/110483 | 10/2006 | |
| WO | WO 2008/045566 | 4/2008 | |
| WO | WO-2015134711 A1 * | 9/2015 | ......... A61K 31/4245 |

OTHER PUBLICATIONS

Finkel et al (PLOS One, Dec. 2013, vol. 8, Issue 12, e81302, pp. 1-10) (Year: 2013).*
Massourides et al (Skeletal Muscle (2015) 5:40) (Year: 2015).*
Peltz et al (Annu Rev Med. 2013; 64: 407-425) (Year: 2013).*
Finkel et al., 2013, "Phase 2a Study of Ataluren-Mediated Dystroph in Production in Patients with Nonsense Mutation Duchenne Muscular Dystrophy." PLoS One, 8(12):e81302 (Published online on Dec. 11, 2013).
International Search Report dated Jul. 1, 2020 in file history of PCT Application No. PCT/US2020/027382 (Publication No. WO 2020/210432) filed Apr. 9, 2020 (2 pages).
Written Opinion dated Jul. 1, 2020 in file history of PCT Application No. PCT/US2020/027382 (Publication No. WO 2020/210432) filed Apr. 9, 2020 (2 pages).
EMEA (European Medicines Agency), "Annex I Summary of product characteristics", Online: https://web.archive.org/web/20190320060942if_/https://www.ema.europa.eu/en/documents/product-information/translarna-epar-product-information_en.pdf (Mar. 20, 2019) pp. 1-39 [retrieved Apr. 30, 2024].
"Translarna (ataluren), EPAR-Medicine Overview", European Medicines Agency, Online: https://www.ema.europa.eu/en/documents/overview/translarna-epar-medicine-overview_en.pdf (Aug. 31, 2018).
"Translarna (ataluren), Translarna-H-C-2720-II-0037: EPAR-Assessment report-Variation", European Medicines Agency, Online: https://www.ema.europa.eu/en/documents/variation-report/translarna-h-c-2720-ii-0037-epar-assessment-report-varitation_en.pdf (Aug. 31, 2018).
"Translama (ataluren), Translarna-H-C-2720-II-0049: EPAR-Assessment Report-Variation", European Medicines Agency, Online: https://www.ema.europa.eu/en/documents/variation-report/translarna-h-c-2720-ii-0049-epar-assessment-report-variation_en.pdf (Mar. 7, 2019).
Lu, Hong et al., "Developmental Pharmacokinetis in Pediatric Populations," J Pediatr Pharmacol Ther (2014) 19(4):262-276.
Massourides, Emmanuelle et al., "Dp412e: a novel human embryonic dystrophin isoform induced by BMP4 in early differentiated cells," Skeletal Muscle (2015) 5:40, 18 pages.
Armstrong, Niki et al., "The Early Care (0-3 Years) in Duchenne Muscular Dystrophy Meeting Report," *Journal of Neuromuscular Diseases*, vol. 11 (2024) 525-533.
Landfeldt, Erik et al., "A mini-review and implementation model for using ataluren to treat nonsense mutation Duchenne muscular dystrophy," *Acta Pædiatrica*, vol. 108 (2019) 224-230.
Li, Shan et al., "Pharmaceuticals Promoting Premature Termination Codon Readthrough: Progress in Development," *Biomolecules*, 13:988 (2023) 29 pages.
Merlini, Luciano et al., "Improving Clinical Trial Design for Duchenne Muscular Dystrophy," *BMC Neurology*, 15:153 (2015) 6 pages.
Strassburg, C. P. et al., "Developmental Aspects of Human Hepatic Drug Glucuronidation in Young Children and Adults," *Gut*, vol. 50 (2002) 259-265.
Extended Search Report mailed Jan. 20, 2025 for European Patent Application No. 24207847.5.

\* cited by examiner

*Primary Examiner* — Jean P Cornet
(74) *Attorney, Agent, or Firm* — Jones Day

(57) ABSTRACT

Provided herein is a method for ameliorating or managing nonsense mutation mediated Duchenne muscular dystrophy (nmDMD) in a pediatric patient in need thereof comprising, administering an effective amount of ataluren to the patient.

10 Claims, 7 Drawing Sheets

METHOD FOR TREATING NONSENSE MUTATION MEDIATED DUCHENNE MUSCULAR DYSTROPHY IN PEDIATRIC PATIENTS

CROSS REFERENCE TO RELATED APPLICATIONS

This application is a U.S. National Stage Application under 35 U.S.C. § 371 of International Patent Application No. PCT/US2020/027382, filed Apr. 9, 2020, which claims priority to U.S. Provisional Application No. 62/831,931, filed on Apr. 10, 2019, the content of each of which is incorporated by reference in its entirety.

FIELD

Provided herein is a method for ameliorating or managing nonsense mutation mediated Duchenne muscular dystrophy (nmDMD) in pediatric patients in need thereof comprising, administering an effective amount of ataluren to the patient.

BACKGROUND

Nonsense mutation Duchenne muscular dystrophy (nmDMD) is a rare, X-linked genetic disorder that results in a decline in muscle function, loss of ambulation, and early death resulting from respiratory or cardiac failure.[1,2,3] Approximately 10-15% of boys with DMD have a nonsense mutation which results in a premature stop codon in the DMD gene and loss of functional dystrophin protein.[1,4,5,6] Loss of dystrophin production causes muscle fibers to tear from repeated contraction, leading to muscle damage and loss, and ultimately a progressive loss of function.[7] Ataluren promotes ribosomal readthrough of a premature stop codon in the DMD gene, enabling formation of full-length functional dystrophin protein, and is the only treatment option that addresses the underlying cause of nmDMD.[8,9,10,11]

Pathogenesis in nmDMD is known to occur prior to birth, as infants and boys with nmDMD have markedly elevated serum creatine kinase levels at birth and measurable deficits in gross and fine motor function prior to the age of three, as compared with their age-matched peers.[14] Early intervention in the disease process of nmDMD, prior to substantial muscle loss and development of fibrosis caused by the pathologic absence of dystrophin, has been noted to be of critical importance by the United States Food and Drug Administration (FDA). Initiation of dystrophin restoration therapy at a younger age, prior to development of the hallmark symptoms of damage associated with DMD, may thus maximize benefit.[10,14,15,16,17] The availability of ataluren for dystrophin restoration therapy at an age younger than five years may ensure functionality is maintained for a longer period of time despite the inexorable decline associated with DMD, thus fulfilling an urgent unmet medical need.

SUMMARY

In one aspect provided herein is a method for ameliorating or managing nonsense mutation mediated Duchenne muscular dystrophy (nmDMD) in a human pediatric patient having nmDMD comprising, orally administering to a patient having an age in a range between greater than or equal to two years of age and an age less than five years of age a therapeutically effective amount of ataluren based on patient weight to attain an average plasma concentration in a range of at least about 1 µg/mL to about 20 µg/mL during a 24 hour time period.

In another aspect provided herein is a method for ameliorating or managing a nonsense mutation mediated Duchenne muscular dystrophy (nmDMD) in a human pediatric patient having a nmDMD comprising, orally administering to a patient having an age in a range between greater than or equal to six months of age and an age less than two years of age a therapeutically effective amount of ataluren based on patient weight to attain an average plasma concentration in a range of at least about 1 µg/mL to about 20 µg/mL during a 24 hour time period.

In one aspect, the approved therapeutically effective amount of ataluren is 40 mg/kg/day of ataluren based on patient weight; wherein the average patient plasma concentration attained is in a range of at least about 1 µg/mL to about 20 µg/mL during a 24 hour time period. In another aspect provided herein, the therapeutically effective amount of 40 mg/kg/day is administered as a morning dose of 10 mg/kg, a midday dose of 10 mg/kg, and, an evening dose of 20 mg/kg; wherein the time period between the morning and midday dose is 6 hours; wherein the time period between the midday and evening dose is 6 hours; and, wherein the time period between the evening dose and the following morning dose is 12 hours.

In another aspect, the therapeutically effective amount of ataluren is about 80 mg/kg/day of ataluren based on patient weight; wherein the average patient plasma concentration attained is in a range of at least about 1 µg/mL to about 20 µg/mL during a 24 hour time period. In another aspect provided herein, the therapeutically effective amount of about 80 mg/kg/day is administered as a morning dose of 20 mg/kg, a midday dose of 20 mg/kg, and, an evening dose of 40 mg/kg; wherein the time period between the morning and midday dose is 6 hours; wherein the time period between the midday and evening dose is 6 hours; and, wherein the time period between the evening dose and the following morning dose is 12 hours.

In another aspect provided herein, the dose is optionally administered within thirty minutes of a meal.

In one aspect provided herein, the therapeutically effective amount administered in a method for ameliorating or managing a nmDMD in a human pediatric patient having nmDMD provides an effect selected from the group consisting of: i). improving the expression of dystrophin protein in a muscle of the patient; ii). improving the patient's performance in a timed function test; iii). improving the patient's performance in an ambulatory assessment or quality of life assessment; iv). ameliorating or managing the onset, development and/or progression of loss of ambulation; v). ameliorating or managing the onset, development and/or progression of loss of cardiopulmonary function associated with nmDMD and the absence of dystrophin; vi). ameliorating or managing the onset, development and/or progression of loss of cardiac function associated with nmDMD; and, vii). ameliorating or managing the onset, development and/or progression of loss of pulmonary function associated with nmDMD.

DETAILED DESCRIPTION

Figure 1A:
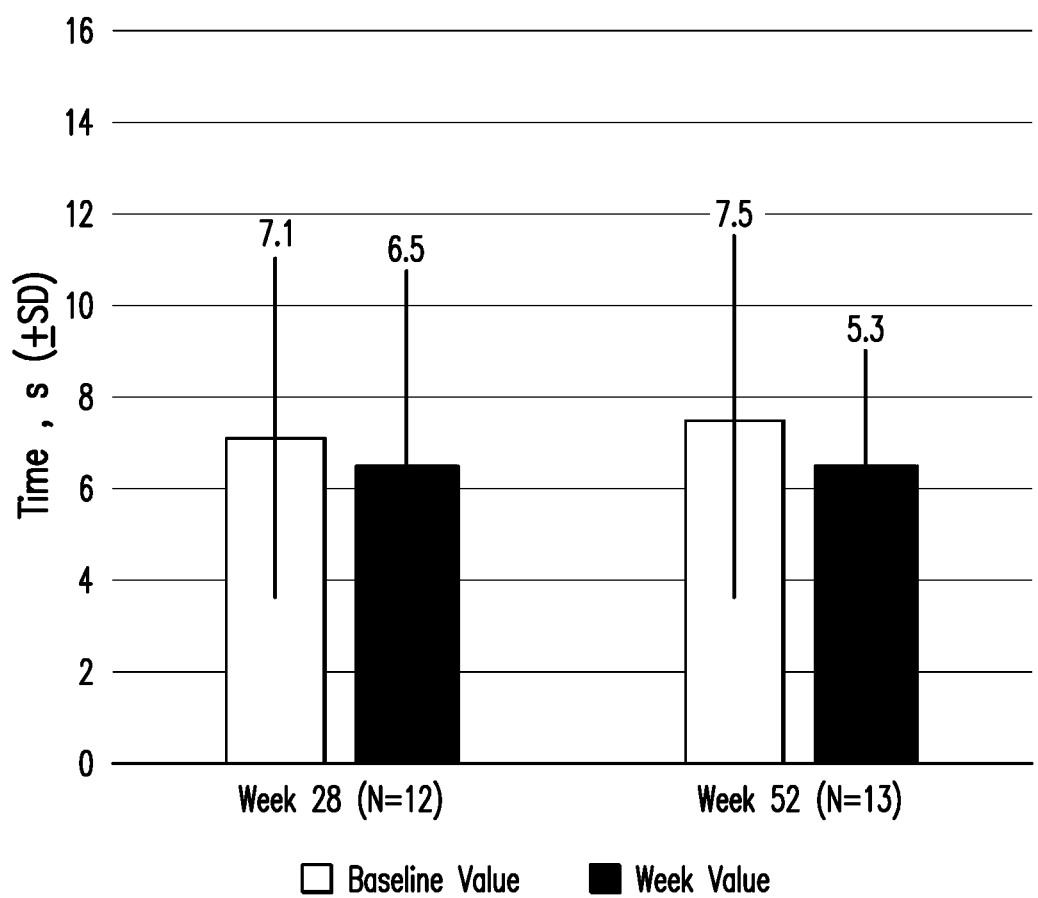
FIG. 1A shows the difference in the mean time taken to accomplish the timed function test of descending 4 stairs at baseline and at weeks 28 and 52.

In one aspect provided herein is a method for ameliorating or managing a nonsense mutation mediated Duchenne muscular dystrophy (nmDMD) in a human pediatric patient having a nmDMD comprising, orally administering to a patient having an age between greater than or equal to two years of age and an age less than five years of age a therapeutically effective amount of ataluren based on patient weight to attain an average plasma concentration in a range of at least about 1 µg/mL to about 20 µg/mL during a 24 hour time period.

In another aspect provided herein is a method for ameliorating or managing a nonsense mutation mediated Duchenne muscular dystrophy (nmDMD) in a human pediatric patient having a nmDMD comprising, orally administering to a patient having an age between greater than or equal to six months of age and an age less than two years of age a therapeutically effective amount of ataluren based on patient weight to attain an average plasma concentration in a range of at least about 1 µg/mL to about 20 µg/mL during a 24 hour time period.

In one aspect, the approved therapeutically effective amount of ataluren is 40 mg/kg/day of ataluren based on patient weight; wherein the average patient plasma concentration attained is in a range of at least about 1 µg/mL to about 20 µg/mL during a 24 hour time period. In another aspect provided herein, the therapeutically effective amount of 40 mg/kg/day is administered as a morning dose of 10 mg/kg, a midday dose of 10 mg/kg, and, an evening dose of 20 mg/kg; wherein the time period between the morning and midday dose is 6 hours; wherein the time period between the midday and evening dose is 6 hours; and, wherein the time period between the evening dose and the following morning dose is 12 hours.

In another aspect, the therapeutically effective amount of ataluren is about 80 mg/kg/day of ataluren based on patient weight; wherein the average patient plasma concentration attained is in a range of at least about 1 µg/mL to about 20 µg/mL during a 24 hour time period. In another aspect provided herein, the therapeutically effective amount of about 80 mg/kg/day is administered as a morning dose of 20 mg/kg, a midday dose of 20 mg/kg, and, an evening dose of 40 mg/kg; wherein the time period between the morning and midday dose is 6 hours; wherein the time period between the midday and evening dose is 6 hours; and, wherein the time period between the evening dose and the following morning dose is 12 hours.

In another aspect provided herein, the dose is optionally administered within thirty minutes of a meal.

In one aspect provided herein, the therapeutically effective amount administered in a method for ameliorating or managing a nmDMD in a human pediatric patient having nmDMD provides an effect selected from the group consisting of: i). improving the expression of dystrophin protein in a muscle of the patient; ii). improving the patient's performance in a timed function test; iii). improving the patient's performance in an ambulatory assessment or quality of life assessment; iv). ameliorating or managing the onset, development and/or progression of loss of ambulation; v). ameliorating or managing the onset, development and/or progression of loss of cardiopulmonary function associated with nmDMD and the absence of dystrophin; vi). ameliorating or managing the onset, development and/or progression of loss of cardiac function associated with nmDMD; and, vii). ameliorating or managing the onset, development and/or progression of loss of pulmonary function associated with nmDMD.

Definitions

As used herein, the term "ataluren" refers to a 3-[5-(2-fluoro-phenyl)-[1,2,4]oxadiazol-3-yl]-benzoic acid compound, having the structure of Formula (I):

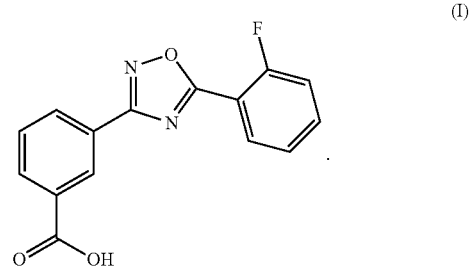 [SMILES: O=C(O)c1cccc(-c2noc(-c3ccccc3F)n2)c1]

In one aspect provided herein, ataluren may be prepared or characterized according to the methods described in U.S. Pat. Nos. 6,992,096, 7,202,262, 7,419,991, 8,227,494, 8,486,982, 8,975,287, 9,205,088, 10,071,081, 7,863,456, 8,101,641, 8,394,966, 8,691,511, 8,748,625, 8,309,206, 10,028,939, 7,678,922, 8,129,540, and 8,367,841, the disclosure of each of which is incorporated herein by reference in its entirety.

In another aspect provided herein, ataluren may be used according to the methods described in U.S. Pat. Nos. 7,772,259, 8,796,322, 9,861,617, 8,716,321, 9,474,743, 10,034,863, 7,683,082, 8,017,636, 8,183,782, 8,299,105, 9,226,919, 9,522,137, 9,737,513, 9,877,952, and 10,172,836, the disclosure of which is incorporated herein by reference in its entirety.

In another aspect provided herein, ataluren is indicated for the treatment of Duchenne muscular dystrophy resulting from a nonsense mutation in the DMD gene, after presence of a nonsense mutation in the dystrophin gene is determined by genetic testing. The Jul. 31, 2014 approval of ataluren by the European Medicines Agency (EMA) for treatment of children having nmDMD as shown by genetic testing at an age greater than or equal to 5 years of age was based on numerous clinical trial results from studies posted on Clinical Trials.gov:

| ClinicalTrials.gov Identifier | First Posted | Study Title |
|---|---|---|
| NCT00264888 | Dec. 13, 2005 | Safety and Efficacy Study of PTC124 in Duchenne Muscular Dystrophy |
| NCT00592553 | Jan. 14, 2008 | Phase 2b Study of PTC124 in Duchenne/Becker Muscular Dystrophy (DMD/BMD) |
| NCT00759876 | Sep. 25, 2008 | Phase 2a Extension Study of Ataluren (PTC124) in Duchenne Muscular Dystrophy (DMD) |
| NCT00847379 | Feb. 19, 2009 | Phase 2b Extension Study of Ataluren (PTC124) in Duchenne/Becker Muscular Dystrophy (DMD/BMD) |
| NCT01009294 | Nov. 6, 2009 | Study of Ataluren (PTCI24 ®) in Nonambulatory Patients With Nonsense-Mutation-Mediated Duchenne/Becker Muscular Dystrophy (nmDMD/BMD) |
| NCT01182324 | Aug. 16, 2010 | The PTC124 (Ataluren) Clinical Trial for Duchenne Muscular Dystrophy: Exploration of the Experiences of Parents, Clinician Researchers, and the Industry Sponsor |
| NCT01247207 | Nov. 24, 2010 | Study of Ataluren in Previously Treated Participants With Nonsense Mutation Dystrophinopathy (nmDBMD) |
| NCT01557400 | Mar. 19, 2012 | Study of Ataluren for Previously Treated Patients With nmDBMD in Europe, Israel, Australia, and Canada |
| NCT01826487 | Apr. 8, 2013 | Phase 3 Study of Ataluren in Patients With Nonsense Mutation Duchenne Muscular Dystrophy (ACT DMD) |
| NCT02090959 | Mar. 19, 2014 | An Extension Study of Ataluren (PTC124) in Participants With Nonsense Mutation Dystrophinopathy |
| NCT02369731 | Feb. 24, 2015 | Registry of Translarna (Ataluren) in Nonsense Mutation Duchenne Muscular Dystrophy (nmDMD) |
| NCT02819557 | Jun. 30, 2016 | Study of Ataluren in ≥2 to <5 Year-Old Males With Duchenne Muscular Dystrophy |
| NCT03179631 | Jun. 7, 2017 | Long-Term Outcomes of Ataluren in Duchenne Muscular Dystrophy |
| NCT03648827 | Aug. 27, 2018 | A Study to Assess Dystrophin Levels in Participants With Nonsense Mutation Duchenne Muscular Dystrophy (nmDMD) |
| NCT03796637 | Jan. 8, 2019 | A Study to Assess Dystrophin Levels in Participants With Nonsense Mutation Duchenne Muscular Dystrophy (nmDMD) Who Have Been Treated With Ataluren |

In particular, the NCT00264888 clinical Phase 2a study demonstrated the feasibility for use of ataluren as a dystrophin restoration therapy. The NCT00592553 randomized, double-blind, placebo-controlled, dose-ranging, multicenter Phase 2b study, conducted in 174 patients with nmDMD, showed a favorable benefit/risk ratio and a safety profile of ataluren consistent with previous studies.[9,11] The results from the NCT01826487 multicenter, randomized, double-blind, placebo-controlled Phase 3 study conducted in boys between the ages of about seven to about 16 years of age with nmDMD showed ataluren to be generally well tolerated, and supported a benefit of ataluren in preserving muscle function.[12,13]

In another aspect provided herein, ataluren has demonstrated therapeutic activity for ameliorating or managing a nonsense mutation mediated disease or disorder selected from Myoshi Myopathy (Wang, J., et al., Membrane blebbing as an assessment of functional rescue of dysferlin-deficient human myotubes via nonsense suppression, J. Appl. Physiol., 2010, 109, 901-905); Infantile Neuronal Ceroid Lipofuscinosis (INCL) (Sarkar, C., et al., Stop codon read-through with PTC124 induces palmitoyl-protein thioesterase-1 activity, reduces thioester load and suppresses apoptosis in cultured cells from INCL patients, Mol. Genet. Metab., 2011, 104 (3), 338-345); Late Infantile Ceroid Lipofuscinosis (LINCL) (Miller. J. N., et al., The role of nonsense-mediated decay in neuronal ceroid lipofuscinosis, Human Molecular Genetics, 2013, 22 (13) 2723-2734); Ataxia Telangiectasia (Du, L., et al., A new series of small molecular weight compounds induce read through of all three types of nonsense mutations in the ATM gene, Mol. Therapy, 2013, 21(9), 1653-1660); Usher Syndrome (USCH1C) (Goldmann, T., et al., PTC124-mediated translational readthrough of a nonsense mutation causing Usher syndrome type 1C, Human Gene Therapy, May 2011, 22, 537-547; and, Goldmann, T., et al., A comparative evaluation of NB30, NB54 and PTC124 in translational readthrough efficacy for treatment of an USH1C nonsense mutation. EMBO Mol. Med., 2012, 4, 1186-1199); Long QT Syndrome (Yu, H., et al., Comparison of read-through effects of aminoglycosides and PTC124 on rescuing nonsense mutations of HERG gene associated with long QT syndrome, Intl. Journal of Mol. Med., 2014, 33, 729-735); Pseudoxanthoma Elasticum (Zhou, Y., et al., Premature Termination Codon Read-Through in the ABCC6 Gene: Potential Treatment for Pseudoxanthoma Elasticum, Journal of Investigat. Derm., 2013, 133, 2672-2677); Xeroderma Pigmentosum (Kuschal, C., et al., Repair of UV photolesions in xeroderma pigmentosum group C cells induced by translational readthrough of premature termination codons, PNAS, 2013, 110 (48), 19483-19488); Choroideremia (Moosajee, M., et al., Clinical utility gene card for: Choroideremia, European Journal of Human Genetics, 2014, 22, e1-e4); Aniridia (Gregory-Evans, C. Y., et al., Postnatal manipulation of Pax6 dosage reverses congenital tissue malformation defects, J. Clin. Invest., 2014, 124(1), 111-116); Heritable pulmonary arterial hypertension (Drake, K. M., et al., Correction of Nonsense BMPR2 and SMAD9 Mutations by Ataluren in Pulmonary Arterial Hypertension, Am. J. Respir. Cell Mol. Biol., September 2013, 49 (3), 403-409); Carnitine Palmitoyl Transferase 1A deficiency (Tan, L., et al., PTC124 improves readthrough and increases enzymatic activity of the CPT1A R160X nonsense mutation, J. Inherit. Metabol. Dis., 2011, 34, 443-447); Propionic Aciduria (Sanchez-Alcudia, R., et al., Feasibility of Nonsense Mutation Readthrough as a Novel Therapeutical Approach in Propionic Acidemia, Human Mutation, 2012, 33, 973-980); Maroteaux-Lamy Syndrome MPS VI (Bartolomeo, R., et al., Pharmacological read-through of nonsense ARSB mutations as a potential therapeutic approach for mucopolysaccharidosis VI, J. Inherit. Metab. Dis., 2013, 36, 363, 371); Hurler's Syndrome (Keeling, unpublished); or, Shwachmann Diamond Syndrome (Bezzerri, V., et. al., Ataluren-driven restoration of Shwachman-Bodian-Diamond syndrome protein function in Shwachman-Diamond syndrome bone marrow, American Journal of Hematology, April 2018, 93(4), 527-536).

In another aspect provided herein, ataluren has potential therapeutic activity for ameliorating or managing a nonsense mutation mediated disease or disorder selected from Achromatopsia, Adrenoleukodystrophy, Alagille Syndrome, Alport Syndrome, Aniridia, Ataxia-telangiectasia, Autosomal dominant polycystic kidney disease (ADPKD), Charcot-Marie-Tooth Syndrome (X-linked), Cancer, Cowden Disease, Darier Disease, Emery-Dreifuss Muscular Dystrophy, Epidermolysis Bullosa, Epilepsy, Fabry Disease, Hereditary Hemorrhagic Telangiectasia, Hereditary Spastic Paraplegia, Hurlers Syndrome, Marfan Syndrome, MPS I, MPS II, MPS IV, Multiple Hereditary Exostoses, Myotonia Congenita (recessive), Myotonic Dystrophy, Nail-Patella Syndrome, Neurofibromatosis Type 1, Neurofibromatosis Type 2, Ocular Albinism, Osteogenesis Imperfecta, Optic Atrophy, Papillon-Lefevre Syndrome, Parkinson Disease (familial), Peutz-Jeghers Syndrome, Primary Ciliary Dyskinesia, Renal Cell Carcinoma, Retinitis Pigmentosa, Retinoblastoma, Rett Syndrome, Spinal Muscular Atrophy, Tuberous Sclerosis, Usher Syndrome, Von Hippel-Lindau Syndrome, Wermer Syndrome, Wilson's Disease, Wolfram syndrome, or Agamma-Globulinemia (X-linked).

In one aspect provided herein, ataluren is a pharmaceutically acceptable free acid for use in the pharmaceutical compositions, processes, and methods provided herein. In another aspect provided herein, ataluren is a pharmaceutically acceptable salt for use in the pharmaceutical compositions, processes, and methods provided herein. In another aspect provided herein, ataluren is a pharmaceutically acceptable anhydrous free acid or salt for use in the pharmaceutical compositions, processes, and methods provided herein.

As used herein, the term "pediatric patient" may be used to refer to a patient having a an age in a range from about newborn to about 18 years. In one aspect, the pediatric patient has an age in a range from about newborn to 18 years, inclusive. In another aspect, the pediatric patient has an age in a range from about newborn to 2 years, inclusive. In another aspect, the pediatric patient is a newborn having an age in a range from about 2 months to about 6 months from about 4 months to about 6 months or greater than about 6 months, In another aspect, the pediatric patient has an age in a range between the ages of 2 and 5 years, inclusive. In another aspect, the pediatric patient has an age in a range between the ages of 5 and 18 years, inclusive.

As used herein, the term "nonsense mutation" refers to a single-point genetic or somatic alteration in the DNA that encodes a premature stop codon mutation, when transcribed, results in a messenger ribonucleic acid (mRNA) triplet (e.g., CAG) that would normally encode for the amino acid glutamine to be converted to a triplet (e.g., UAG) that is interpreted as a stop codon (i.e., a premature stop codon). The presence of the premature stop codon within the mRNA leads to production of a truncated, non-functional protein and consequent disease.

As used herein, the term "premature stop codon" refers to the result of a DNA mutation that encodes a stop codon in mRNA instead of an amino acid.

As used herein, the term "therapeutically effective amount" refers to that amount of ataluren administered to a patient based on patient weight that is sufficient to attain an average plasma concentration in a range of at least about 1 µg/mL to about 20 µg/mL during a 24 hour time period. In particular, modeling data from clinical study results (NCT00264888) indicates that the average plasma concentration is at least about 0.9 µg/mL to about 17.6 µg/mL during a 24 hour time period. The effective plasma concentration range providing maximum benefit, as demonstrated by 6 minute walking distance (6 MWD), has been shown to be between 2 to 19 ug/mL, typically found to be within 2 hours post morning dose.

In one aspect, the therapeutically effective amount of ataluren is about 40 mg/kg/day of ataluren based on patient weight; wherein the average patient plasma concentration attained is in a range of at least about 1 µg/mL to about 20 µg/mL during a 24 hour time period. In another aspect provided herein, the therapeutically effective amount of about 40 mg/kg/day is administered as a morning dose of 10 mg/kg, a midday dose of 10 mg/kg, and, an evening dose of 20 mg/kg; wherein the time period between the morning and midday dose is 6 hours; wherein the time period between the midday and evening dose is 6 hours; and, wherein the time period between the evening dose and the following morning dose is 12 hours.

In one aspect, the therapeutically effective amount of ataluren is about 80 mg/kg/day of ataluren based on patient weight; wherein the average patient plasma concentration attained is in a range of at least about 1 µg/mL to about 20 µg/mL during a 24 hour time period. In another aspect provided herein, the therapeutically effective amount of about 80 mg/kg/day is administered as a morning dose of 20 mg/kg, a midday dose of 20 mg/kg, and, an evening dose of 40 mg/kg; wherein the time period between the morning and midday dose is 6 hours; wherein the time period between the midday and evening dose is 6 hours; and, wherein the time period between the evening dose and the following morning dose is 12 hours.

In another aspect provided herein, the dose is optionally administered within thirty minutes of a meal.

In one aspect provided herein, the therapeutically effective amount administered in a method for ameliorating or managing a nmDMD in a human pediatric patient having nmDMD provides an effect selected from the group consisting of: i). improving the expression of dystrophin protein in a muscle of the patient; ii). improving the patient's performance in a timed function test; iii). improving the patient's performance in an ambulatory assessment or quality of life assessment; iv). ameliorating or managing the onset, development and/or progression of loss of ambulation; v). ameliorating or managing the onset, development and/or progression of loss of cardiopulmonary function associated with nmDMD; vi). ameliorating or managing the onset, development and/or progression of loss of cardiac function associated with nmDMD; and, vii). ameliorating or managing the onset, development and/or progression of loss of pulmonary function associated with nmDMD.

As used herein, the term "functional" in the context of a functional read-through protein refers to a protein that is produced in a sufficient quantity to treat, prevent or ameliorate a disease that results from the absence of the protein. In addition, the term refers to a protein that has enough of the functional activity of the wild-type protein to have a beneficial effect in a cell or subject which otherwise does not produce or produces insufficient amounts of the wild-type protein as a result of a mutation (e.g., a nonsense mutation) in the nucleic acid sequence (e.g., gene) encoding the protein. In a specific aspect, the functional read-through protein(s) substantially performs the function of the full-length wild-type protein(s), i.e., ameliorating or managing the disease. In another specific aspect, the functional read-through protein(s) performs one, two, three or more of the functions of the full-length wild-type protein(s). In certain aspects, the functional read-through protein(s) produced is a functional non-wild-type protein(s). In certain aspects, the functional read-through protein(s) produced is the functional wild-type protein(s). In some aspects, the functional non-wild-type protein produced is full-length. In some aspects, the functional wild-type protein produced is full-length. In other aspects, the functional non-wild-type protein(s) is not full-length. In other aspects, the functional wild-type protein (s) produced is not full-length.

As used herein, the term "substantially performs the function of the full-length wild-type protein(s)," in the context of a functional read-through protein(s), means that the functional read-through protein(s) performs at least one, two, three, or more functions of the full-length wild-type protein(s).

As used herein, the term "nonsense mutation mediated DMD" refers to a Duchenne Muscular Dystrophy, wherein a nonsense mutation in the dystrophin gene encodes a premature stop codon in the mRNA, resulting in loss of production of functional dystrophin protein.

As used herein, "in combination" in the context of the administration of therapies refers to the use of more than one therapy. The use of the term "in combination" does not restrict the order in which therapies are administered to a subject with a disease. In certain aspects, administration of one or more therapies to a subject with a disease includes, without limitation, a first therapy that can be administered prior to (e.g., 1 minute, 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks before), concomitantly with, or subsequent to (e.g., 1 minute, 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks after) the administration of a second therapy to a subject which had, has, or is susceptible to a disease. The therapies are administered to a subject in a sequence and within a time interval such that a unit dosage form(s) described herein can act together with another therapy to provide an increased benefit than if the therapies were administered alone.

As used herein, the terms "ameliorate or manage" or "ameliorating or managing" refer to the beneficial effects derived by a pediatric patient from the administration of a therapeutically effective amount of ataluren as provided herein, which slows the inevitable loss of function associated with nmDMD and thus affects the symptoms of nmDMD. When a pediatric patient has been diagnosed with nmDMD associated with a genetic or somatic nonsense mutation, an effective amount of ataluren as described herein can be administered to the pediatric patient to ameliorate or manage a nmDMD in the patient having nmDMD by providing a therapeutically beneficial effect selected from the group consisting of: i). improving the expression of dystrophin protein in a muscle of the patient; ii). improving the patient's performance in a timed function test; iii). improving the patient's performance in an ambulatory assessment or quality of life assessment; iv). ameliorating or managing the onset, development and/or progression of loss of ambulation; v). ameliorating or managing the onset, development and/or progression of loss of cardiopulmonary function associated with nmDMD; vi). ameliorating or managing the onset, development and/or progression of loss of cardiac function associated with nmDMD; and, vii). ameliorating or managing the onset, development and/or progression of loss of pulmonary function associated with nmDMD.

As used herein, the term "about" or "approximately" means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 20%, 15%, 10%, 9%, 8%, 7%, 6%, 5%, 4%, 3%, 2%, 1%, 0.5%, or 0.05% of a given value or range.

As used herein, the term "wild-type" in the context of a protein refers to a protein that is found in nature (often, but not necessarily, the protein that is the predominant protein whose absence is responsible for the disease) and is designated as a standard or reference protein.

Ataluren Salt Forms

In certain aspects, the methods provided herein comprise the use of a salt form of ataluren, including salts selected from L-arginine, L-histidine, L-lysine, N-methyl glucamine, magnesium methoxide, potassium hydroxide, sodium hydroxide or tromethamine (PCT Application No. PCT/US2015/018889, filed Mar. 5, 2015, published as International Patent Application No. WO 2015/134711, which is incorporated by reference herein in its entirety). More particularly, the methods provided herein comprise the use of a salt form of ataluren selected from L-lysine, sodium and tromethamine.

Pharmaceutical Compositions

Pharmaceutical compositions and single unit dosage forms comprising an effective amount of ataluren can be used in the methods provided herein. Individual dosage forms may be suitable for oral, dermal, mucosal (including, without limitation, sublingual, buccal, rectal, nasal, or vaginal) or parenteral (including, without limitation, subcutaneous, intramuscular, intraarterial, intraperitoneal, intrathecal, intraventricular, intraurethral, intrasternal, intracranial, intrasynovial, intravesical or intravenous) or ocular administration. Preferred pharmaceutical compositions and single unit dosage forms are suitable for oral administration.

In certain aspects, the pharmaceutical composition comprises from about 0.1% to about 99%, from about 5% to about 90%, from about 5% to about 50%, from about 10% to about 40%, from about 20% to about 30%, from about 0.1% to about 5%, from about 0.1% to about 2.5%, from about 0.1% to about 1% or from about 0.25% to about 0.5% by weight of ataluren. In certain aspects, the pharmaceutical composition comprises about 0.1%, about 0.25%, about 0.5%, about 1%, about 2%, about 5%, about 10%, about 15%, about 20%, about 25%, about 30%, about 35%, about 40%, about 50%, about 60%, about 70%, about 80%, or about 90% by weight of ataluren. In certain aspects, the pharmaceutical composition comprises about 0.25%, about 0.5% or about 1% by weight of ataluren.

In certain aspects, the pharmaceutical composition provided herein comprises from about 1 mg to about 5,000 mg, from about 10 mg to about 2,000 mg, from about 50 mg to about 1,000 mg, from about 100 mg to about 1,000 mg, or from about 100 mg to about 500 mg of ataluren. In certain aspects, the pharmaceutical composition provided herein comprises about 125 mg, about 200 mg, about 325 mg, about 400 mg, or about 500 mg of ataluren. In certain aspects, the pharmaceutical composition provided herein comprises from about 120 mg to about 130, from about 195 mg to about 205 mg, from about 320 mg to about 330 mg, from about 395 mg to about 405 mg, or from about 495 mg to about 505 mg of ataluren.

In certain aspects, ataluren in the pharmaceutical compositions provided herein is the free acid of ataluren, as provided herein.

In certain aspects, ataluren in the pharmaceutical compositions provided herein is a salt form of ataluren, as provided herein.

The pharmaceutical compositions provided herein can be provided in a unit dosage form or multiple-dosage form. A unit dosage form, as used herein, refers to a physically discrete unit suitable for administration to a human or animal subject using packaging known in the art. Each unit-dose contains a predetermined quantity of an active ingredient(s) sufficient to produce the desired therapeutic effect, in association with the required pharmaceutical carriers or excipients. Examples of a unit dosage form include, without limitation, an individually packaged packet, sachet or bottle or dropper. A unit dosage form may be administered in fractions or multiples thereof. A multiple-dosage form is a plurality of identical unit dosage forms packaged in a single container to be administered as segregated or combined unit dosage forms. Examples of a multiple-dosage form include a packet or sachet of granules or powder, a vial or bottle of tablets or capsules, or a bottle of liquid solution in fluid ounces, pints or gallons for administration either parenterally, orally or ocularly via dropper.

The pharmaceutical compositions provided herein can be administered as a divided dose over a period of time. It is understood that the precise dosage and duration of treatment may vary with the age, weight, and condition of the patient being treated, and may be determined empirically using known testing protocols or by extrapolation from in vivo or in vitro test or diagnostic data or by observation of certain clinical factors. It is further understood that for any particular individual, specific dosage regimens may be adjusted over time according to the individual need and the professional judgment of the person administering or supervising the administration of the pharmaceutical composition.

Oral Formulations

The pharmaceutical compositions provided herein are formulated for oral administration. In certain aspects, the pharmaceutical compositions provided herein for oral administration are provided in solid, semisolid, or liquid dosage forms for oral administration. As used herein, oral administration also includes buccal, lingual, and sublingual administration. Suitable oral dosage forms include, but are not limited to, tablets, sublingual or buccal films (i.e., "fast-melts"), chewable tablets, effervescent tablets, dispersible tablets, mini-tablets, capsules, pills, strips, troches, lozenges, pastilles, oral film, cachets, pellets, medicated chewing gum, bulk powders or granules, effervescent or non-effervescent powders or granules, oral mists, solutions, emulsions, suspensions, wafers, sprinkles, elixirs, and syrups. In addition to the active ingredient, the pharmaceutical compositions can contain one or more pharmaceutically acceptable carriers or excipients including, but not limited to, binders, fillers, diluents, disintegrants, wetting agents, surfactants, lubricants, glidants, pH-modifiers, coloring agents, dye-migration inhibitors, sweetening agents, flavoring agents, emulsifying agents, suspending and dispersing agents, preservatives, solvents, solvating agents, non-aqueous liquids, organic acids, and sources of carbon dioxide.

Binders or granulators impart cohesiveness to a tablet to ensure the tablet remaining intact after compression. Suitable binders or granulators include, but are not limited to, starches, such as corn starch, potato starch, and pre-gelatinized starch (e.g., STARCH 1500); gelatin; sugars, such as sucrose, glucose, dextrose, molasses, and lactose; natural and synthetic gums, such as acacia, alginic acid, alginates, extract of Irish moss, panwar gum, ghatti gum, mucilage of isabgol husks, carboxymethylcellulose, methylcellulose, polyvinylpyrrolidone (PVP), Veegum, larch arabogalactan, powdered tragacanth, and guar gum; celluloses, such as ethyl cellulose, cellulose acetate, carboxymethyl cellulose (CMC), carboxymethyl cellulose calcium, sodium carboxymethyl cellulose, methyl cellulose, hydroxyethylcellulose (HEC), hydroxypropylcellulose (HPC), hydroxypropyl methyl cellulose (HPMC); microcrystalline celluloses, such as AVICEL®-PH-101, AVICEL®-PH-103, AVICEL® RC-581, AVICEL®-PH-105 (FMC Corp., Marcus Hook, PA); and mixtures thereof. Suitable fillers include, but are not limited to, talc, calcium carbonate, microcrystalline cellulose, powdered cellulose, dextrates, kaolin, mannitol, silicic acid, sorbitol, starch, pre-gelatinized starch, and mixtures thereof.

Suitable diluents include, but are not limited to, dicalcium phosphate, calcium sulfate, lactose, sorbitol, sucrose, inositol, cellulose, kaolin, mannitol, sodium chloride, dry starch, and powdered sugar. Certain diluents, such as mannitol, lactose, sorbitol, sucrose, and inositol, when present in sufficient quantity, can impart properties to some compressed tablets that permit disintegration in the mouth by chewing. Such compressed tablets can be used as chewable tablets.

Suitable disintegrants include, but are not limited to, agar; bentonite; celluloses, such as methyl cellulose and carboxymethyl cellulose; wood products; natural sponge; cation-exchange resins; alginic acid; gums, such as guar gum and VEEGUM® HV; citrus pulp; cross-linked celluloses, such as croscarmellose; cross-linked polymers, such as crospovidone; cross-linked starches; calcium carbonate; microcrystalline cellulose, such as sodium starch glycolate; polacrilin potassium; starches, such as corn starch, potato starch, tapioca starch, and pre-gelatinized starch; clays; aligns; and mixtures thereof. The pharmaceutical compositions provided herein may contain from about 0.5 to about 15% or from about 1 to about 5% by weight of a disintegrant.

Suitable lubricants include, but are not limited to, calcium stearate; magnesium stearate; mineral oil; light mineral oil; glycerin; sorbitol; mannitol; glycols, such as glycerol behenate and polyethylene glycol (PEG); stearic acid; sodium lauryl sulfate; talc; hydrogenated vegetable oil, including peanut oil, cottonseed oil, sunflower oil, sesame oil, olive oil, corn oil, and soybean oil; zinc stearate; ethyl oleate; ethyl laureate; agar; starch; lycopodium; silica or silica gels, such as AEROSIL® 200 (W.R. Grace Co., Baltimore, MD) and CAB-O-SIL® (Cabot Co. of Boston, MA); and mixtures thereof. The pharmaceutical compositions provided herein may contain about 0.1 to about 5% by weight of a lubricant.

Suitable glidants include, but are not limited to, colloidal silicon dioxide, CAB-O-SIL® (Cabot Co. of Boston, MA), and asbestos-free talc. Suitable coloring agents include, but are not limited to, any of the approved, certified, water soluble FD&C dyes, and water insoluble FD&C dyes suspended on alumina hydrate, and color lakes and mixtures thereof. A color lake is the combination by adsorption of a water-soluble dye to a hydrous oxide of a heavy metal, resulting in an insoluble form of the dye. Suitable flavoring agents include, but are not limited to, natural flavors extracted from plants, such as fruits, and synthetic blends of compounds which produce a pleasant taste sensation, such as peppermint and methyl salicylate. Suitable sweetening agents include, but are not limited to, sucrose, lactose, mannitol, syrups, glycerin, and artificial sweeteners, such as saccharin and aspartame. Suitable emulsifying agents include, but are not limited to, gelatin, acacia, tragacanth, bentonite, and surfactants, such as polyoxyethylene sorbitan monooleate (TWEEN® 20), polyoxyethylene sorbitan monooleate 80 (TWEEN® 80), and triethanolamine oleate. Suitable suspending and dispersing agents include, but are not limited to, sodium carboxymethylcellulose, pectin, tragacanth, Veegum, acacia, sodium carbomethylcellulose, hydroxypropyl methylcellulose, and polyvinylpyrrolidone. Suitable preservatives include, but are not limited to, glycerin, methyl and propylparaben, benzoic add, sodium benzoate and alcohol. Suitable wetting agents include, but are not limited to, propylene glycol monostearate, sorbitan monooleate, diethylene glycol monolaurate, and polyoxyethylene lauryl ether. Suitable solvents include, but are not limited to, glycerin, sorbitol, ethyl alcohol, and syrup. Suitable non-aqueous liquids utilized in emulsions include, but are not limited to, mineral oil and cottonseed oil. Suitable organic acids include, but are not limited to, citric, fumaric acid, ascorbic acid and tartaric acid. Suitable sources of carbon dioxide include, but are not limited to, sodium bicarbonate and sodium carbonate. It should be understood that many carriers and excipients may serve a plurality of functions, even within the same formulation.

The pharmaceutical compositions provided herein as a tablet for oral administration can be provided as compressed tablets, tablet triturates, chewable lozenges, rapidly dissolving tablets, effervescent tablets, mini tablets, beads, coated beads, multiple compressed tablets, or enteric-coating tablets, sugar-coated, or film-coated tablets. Enteric-coated tablets are compressed tablets coated with substances that resist the action of stomach acid but dissolve or disintegrate in the intestine, thus protecting the active ingredient from the acidic environment of the stomach. Enteric-coatings include, but are not limited to, fatty acids, fats, phenyl salicylate, waxes, shellac, ammoniated shellac, and cellulose acetate phthalates. Sugar-coated tablets are compressed tablets surrounded by a sugar coating, which may be beneficial in covering up objectionable tastes or odors and in protecting the tablets from oxidation. Film-coated tablets are compressed tablets that are covered with a thin layer or film of a water-soluble material. Film coatings include, but are not limited to, hydroxyethylcellulose, sodium carboxymethylcellulose, polyethylene glycol 4000, and cellulose acetate phthalate. Film coating imparts the same general characteristics as sugar coating. Multiple compressed tablets are compressed tablets made by more than one compression cycle, including layered tablets, and press-coated or dry-coated tablets.

The tablet dosage forms can be prepared from the active ingredient in powdered, crystalline, or granular forms, alone or in combination with one or more carriers or excipients described herein, including binders, disintegrants, controlled-release polymers, lubricants, diluents, and/or colorants. Flavoring and sweetening agents are especially useful in the formation of chewable tablets and lozenges.

The pharmaceutical compositions provided herein for oral administration can be provided as soft or hard capsules, which can be made from gelatin, methylcellulose, starch, or calcium alginate. The hard gelatin capsule, also known as the dry-filled capsule (DFC), consists of two sections, one slipping over the other, thus completely enclosing the active ingredient. The soft elastic capsule (SEC) is a soft, globular shell, such as a gelatin shell, which is plasticized by the addition of glycerin, sorbitol, or a similar polyol. The soft gelatin shells may contain a preservative to prevent the growth of microorganisms. Suitable preservatives are those as described herein, including methyl- and propyl-parabens, and sorbic acid. The liquid, semisolid, and solid dosage forms provided herein may be encapsulated in a capsule. Suitable liquid and semisolid dosage forms include solutions and suspensions in propylene carbonate, vegetable oils, or triglycerides. The capsules may also be coated as known by those of skill in the art in order to modify or sustain dissolution of the active ingredient.

The pharmaceutical compositions provided herein for oral administration can be provided in liquid and semisolid dosage forms, including emulsions, solutions, suspensions, elixirs, and syrups. An emulsion is a two-phase system, in which one liquid is dispersed in the form of small globules throughout another liquid, which can be oil-in-water or water-in-oil. Emulsions may include a pharmaceutically acceptable non-aqueous liquid or solvent, solvating agent or emulsifying agent, and preservative. Suspensions may include a pharmaceutically acceptable suspending agent and preservative. Aqueous alcoholic solutions may include a pharmaceutically acceptable acetal, such as a di(lower alkyl) acetal of a lower alkyl aldehyde, e.g., acetaldehyde diethyl acetal; and a water-miscible solvent having one or more hydroxyl groups, such as propylene glycol and ethanol. Elixirs are clear, sweetened, and hydroalcoholic solutions. Syrups are concentrated aqueous solutions of a sugar, for example, sucrose, and may also contain a preservative. For a liquid dosage form, for example, a solution in a polyethylene glycol may be diluted with a sufficient quantity of a pharmaceutically acceptable liquid carrier, e.g., water, to be measured conveniently for administration.

Other useful liquid and semisolid dosage forms include, but are not limited to, those containing the active ingredient(s) provided herein, and a dialkylated mono- or polyalkylene glycol including, 1,2-dimethoxymethane, diglyme, triglyme, tetraglyme, polyethylene glycol-350-dimethyl ether, polyethylene glycol-550-dimethyl ether, polyethylene glycol-750-dimethyl ether, wherein 350, 550, and 750 refer to the approximate average molecular weight of the polyethylene glycol. These formulations can further comprise one or more antioxidants, such as butylated hydroxytoluene (BHT), butylated hydroxyanisole (BHA), propyl gallate, vitamin E, ethylenediamine tetraacetic acid (EDTA), hydroquinone, hydroxycoumarins, ethanolamine, lecithin, cephalin, ascorbic acid, malic acid, sorbitol, phosphoric acid, bisulfite, sodium metabisulfite, thiodipropionic acid and its esters, and dithiocarbamates.

The pharmaceutical compositions provided herein for oral administration can be also provided in the forms of liposomes, micelles, microspheres, or nanosystems.

The pharmaceutical compositions provided herein for oral administration can be provided as either non-effervescent or effervescent tablets or granules and powders, to be reconstituted into a liquid dosage form. Pharmaceutically acceptable carriers and excipients used in the non-effervescent granules or powders may include diluents, sweeteners, and wetting agents. Pharmaceutically acceptable carriers and excipients used in the effervescent granules or powders may include organic acids and a source of carbon dioxide.

In certain aspects, the pharmaceutical composition is formulated as a solid oral dosage form. In certain aspects, the pharmaceutical composition is formulated as a liquid oral dosage form. In certain aspects, the unit dosage form is provided as a suspension after being mixed in a pharmaceutically acceptable liquid or semi-solid solvating agent, which includes, but is not limited to, water, milk, carbonated beverage, juice, fruit juice, fruit punch, applesauce, yogurt, pudding, ice cream, baby food, baby formula or a soy or grain based product.

In certain aspects, provided herein are pharmaceutical compositions, which comprise or a pharmaceutically acceptable salt thereof and one or more additional pharmaceutically acceptable excipients. In one aspect, the pharmaceutical composition is formulated as a powder. In one aspect, the pharmaceutical composition is formulated as a micronized powder. In one aspect, the pharmaceutical composition is formulated as a nanoparticle. In one aspect, the pharmaceutical composition is formulated as granules. In another aspect, the one or more excipients are selected from the group consisting of polydextrose, mannitol, poloxamer, polyethylene glycol, hydroxyethyl cellulose, crospovidone, artificial flavoring, and magnesium stearate. In certain aspects, the artificial flavoring is an artificial vanilla flavor.

Additionally provided herein are pharmaceutical composition comprising about 25% by weight of ataluren; about 1% by weight of colloidal silicon dioxide; and one or more additional pharmaceutically acceptable excipients. In certain aspects, pharmaceutical compositions provided herein comprise ataluren and one or more excipients selected from polydextrose, poloxamer (e.g., poloxamer 407), polyethylene glycol (e.g., polyethylene glycol 3350), mannitol, hydroxyethyl cellulose, artificial vanilla flavoring, crospovidone, colloidal silicon dioxide, and magnesium stearate (e.g., of vegetable origin). In certain aspects, pharmaceutical compositions provided herein comprise ataluren and one or more excipients selected from a suspending agent, a binding agent that can also provide taste-masking, surfactant agent, a disintegrant and other excipients can be present. In one aspect, the pharmaceutical composition is formulated as a powder. In one aspect, the pharmaceutical composition is formulated as a micronized powder. In one aspect, the pharmaceutical composition is formulated as a nanoparticle. In one aspect, the pharmaceutical composition is formulated as granules. In another aspect, ataluren is present in an amount such as at about 25% by weight). In another aspect, the one or more excipients are selected from the group consisting of polydextrose, mannitol, poloxamer, polyethylene glycol, hydroxyethyl cellulose, crospovidone, artificial vanilla flavor, and magnesium stearate. In another aspect, the one or more excipients (and their proportions of the total formulation weight) are selected from the group consisting of a suspending agent such as Litesse® Ultra [refined polydextrose] at about 26% by weight, a binding agent such as mannitol at about 26% by weight, surfactant agents such as polyethylene glycol 3350 at about 10.0% by weight and Lutrol® micro F127 [poloxamer 407 powder] at about 4% by weight, a disintegrant such as crospovidone at about 5% by weight, and other excipients, each less than about 2% by weight such as Cab-O-Sil™, hydroxyethyl cellulose, magnesium stearate [non-bovine] at about 1% by weight and colloidal silicon dioxide at about 1% by weight.

Further provided herein are pharmaceutical compositions comprising about 25% by weight of ataluren, about 26% by weight of polydextrose, about 26% by weight of mannitol, about 3% by weight of poloxamer, about 10% by weight of polyethylene glycol, about 2% by weight of hydroxyethyl cellulose, about 5% by weight of crospovidone, about 1% by weight of artificial vanilla flavor, about 1% by weight of colloidal silicon dioxide and about 1% by weight of magnesium stearate. In one aspect, the pharmaceutical composition is formulated as a powder. In one aspect, the pharmaceutical composition is formulated as a micronized powder. In one aspect, the pharmaceutical composition is formulated as a nanoparticle. In one aspect, the pharmaceutical composition is formulated as granules.

Further provided herein are pharmaceutical compositions comprising, ataluren in a range of from about 120 mg to about 1005 mg, polydextrose in a range of from about 133 mg to about 1030 mg, mannitol in a range of from about 137 mg to about 901 mg, poloxamer in a range of from about 19 mg to about 147 mg, polyethylene glycol in a range of from about 52 mg to about 402 mg, hydroxyethyl cellulose in a range of from about 7 mg to about 59 mg, crospovidone in a range of from about 26 mg to about 201 mg, artificial vanilla flavor in a range of from about 3 mg to about 29 mg, colloidal silicon dioxide in a range of from about 5 mg to about 39 mg and magnesium stearate in a range of from about 5 mg to about 39 mg. In one aspect, the pharmaceutical composition is formulated as powder. In one aspect, the pharmaceutical composition is formulated as a powder. In one aspect, the pharmaceutical composition is formulated as a micronized powder. In one aspect, the pharmaceutical composition is formulated as a nanoparticle. In one aspect, the pharmaceutical composition is formulated as granules.

Further provided herein are pharmaceutical compositions, comprising about 130 mg of ataluren, about 133 mg of polydextrose, about 137 mg of mannitol, about 19 mg of poloxamer, about 52 mg of polyethylene glycol, about 7 mg of hydroxyethyl cellulose, about 26 mg of crospovidone, about 3 mg of artificial vanilla flavor, about 5 mg of colloidal silicon dioxide and about 5 mg of magnesium stearate. In one aspect, the pharmaceutical composition is formulated as a powder. In one aspect, the pharmaceutical composition is formulated as a micronized powder. In one aspect, the pharmaceutical composition is formulated as a nanoparticle. In one aspect, the pharmaceutical composition is formulated as granules.

Further provided herein are pharmaceutical compositions, comprising about 205 mg of ataluren, about 210 mg of polydextrose, about 216 mg of mannitol, about 30 mg of poloxamer, about 82 mg of polyethylene glycol, about 12 mg of hydroxyethyl cellulose, about 41 mg of crospovidone, about 6 mg of artificial vanilla flavor, about 8 mg of colloidal silicon dioxide and about 8 mg of magnesium stearate. In one aspect, the pharmaceutical composition is formulated as a powder. In one aspect, the pharmaceutical composition is formulated as a micronized powder. In one aspect, the pharmaceutical composition is formulated as a nanoparticle. In one aspect, the pharmaceutical composition is formulated as granules.

Further provided herein are pharmaceutical compositions, comprising about 330 mg of ataluren, about 338 mg of polydextrose, about 348 mg of mannitol, about 48 mg of poloxamer, about 132 mg of polyethylene glycol, about 19 mg of hydroxyethyl cellulose, about 66 mg of crospovidone, about 9 mg of artificial vanilla flavor, about 13 mg of colloidal silicon dioxide and about 13 mg of magnesium stearate. In one aspect, the pharmaceutical composition is formulated as a powder. In one aspect, the pharmaceutical composition is formulated as a micronized powder. In one aspect, the pharmaceutical composition is formulated as a nanoparticle. In one aspect, the pharmaceutical composition is formulated as granules.

Further provided herein are pharmaceutical compositions, comprising about 405 mg of ataluren, about 415 mg of polydextrose, about 427 mg of mannitol, about 59 mg of poloxamer, about 162 mg of polyethylene glycol, about 24 mg of hydroxyethyl cellulose, about 81 mg of crospovidone, about 12 mg of artificial vanilla flavor, about 16 mg of colloidal silicon dioxide and about 16 mg of magnesium stearate. In one aspect, the pharmaceutical composition is formulated as a powder. In one aspect, the pharmaceutical composition is formulated as a micronized powder. In one aspect, the pharmaceutical composition is formulated as a nanoparticle. In one aspect, the pharmaceutical composition is formulated as granules.

Further provided herein are pharmaceutical compositions, comprising about 505 mg of ataluren, about 518 mg of polydextrose, about 453 mg of mannitol, about 74 mg of poloxamer, about 202 mg of polyethylene glycol, about 30 mg of hydroxyethyl cellulose, about 101 mg of crospovidone, about 15 mg of artificial vanilla flavor, about 20 mg of colloidal silicon dioxide and about 20 mg of magnesium stearate. In one aspect, the pharmaceutical composition is formulated as a powder. In one aspect, the pharmaceutical composition is formulated as a micronized powder. In one aspect, the pharmaceutical composition is formulated as a nanoparticle. In one aspect, the pharmaceutical composition is formulated as granules.

Further provided herein are pharmaceutical compositions, comprising about 1005 mg of ataluren, about 1030 mg of polydextrose, about 901 mg of mannitol, about 147 mg of poloxamer, about 402 mg of polyethylene glycol, about 59 mg of hydroxyethyl cellulose, about 201 mg of crospovidone, about 29 mg of artificial vanilla flavor, about 39 mg of colloidal silicon dioxide and about 39 mg of magnesium stearate. In one aspect, the pharmaceutical composition is formulated as a powder. In one aspect, the pharmaceutical composition is formulated as a micronized powder. In one aspect, the pharmaceutical composition is formulated as a nanoparticle. In one aspect, the pharmaceutical composition is formulated as granules.

In certain aspects, the unit dosage form comprises from about 35 mg to about 5,600 mg of ataluren, from about 35 mg to about 2800 mg of ataluren, from about 35 mg to about 1,400 mg of ataluren, from about 125 mg to about 1,000 mg of ataluren, from about 250 mg to about 1,000 mg of ataluren, from about 325 mg to about 1,000 mg of ataluren or from about 500 mg to about 1,000 mg of ataluren.

In certain aspects, the unit dosage form comprises about 35 mg, about 50 mg, about 70 mg, about 100 mg, about 125 mg, about 140 mg, about 175 mg, about 200 mg, about 250 mg, about 280 mg, about 325 mg, about 350 mg, about 400 mg, about 450 mg, about 500 mg, about 560 mg, about 700 mg, about 750 mg, about 1,000 mg, about 1,400 mg, about 2800 mg or about 5600 mg of ataluren.

In a particular aspect, the unit dosage form comprises about 125 mg, about 250 mg or about 1,000 mg of ataluren.

In a more particular aspect, the unit dosage form comprises 125 mg, 250 mg or 1,000 mg of ataluren.

In certain aspects, the pharmaceutical composition is formulated as a powder. In one aspect, the pharmaceutical composition is formulated as a micronized powder. In one aspect, the pharmaceutical composition is formulated as a nanoparticle. In another aspect, the pharmaceutical composition provided herein is formulated as granules. In certain aspects, the pharmaceutical composition provided herein is packaged in a packet or sachet. In certain aspects, the pharmaceutical composition provided herein is packaged in a heat-sealed laminated aluminum packet or sachet. In certain aspects, the pharmaceutical composition provided herein is packaged in a child-resistant packet or sachet. In certain aspects, the pharmaceutical composition provided herein is packaged in a packet or sachet, which comprises layers of polyethylene terephthalate, polyethelyene, aluminum foil, adhesive, and sealing film. In certain aspects, the pharmaceutical composition may be provided in a bottle including, but not limited to, high density polyethylene (HDPE) bottles.

In certain aspects, the pharmaceutical composition provided herein is formulated as granules for reconstitution. In certain aspects, the pharmaceutical composition provided herein is formulated as granules for reconstitution as an oral suspension.

In certain aspects, the pharmaceutical composition provided herein is reconstituted before administration by being mixed to a suspension with a pharmaceutically acceptable liquid or semi-solid solvating agent which includes, but is not limited to, water, milk, carbonated beverage, juice, fruit juice, fruit punch, applesauce, yogurt, pudding, ice cream, baby food, baby formula or a soy or grain based product.

In certain aspects, the pharmaceutical composition provided herein is reconstituted before administration by being mixed to a suspension with water. In one aspect, reconstitution of a 125 mg unit dosage formulation of ataluren is carried out by the addition of at least about 5 mL of water directly in a bottle containing ataluren to achieve a nominal concentration of at least about 25 mg/mL in the total volume of suspension. In another aspect, reconstitution of a 250 mg unit dosage formulation ataluren is carried out by the addition of at least about 10 mL of water directly in a bottle containing ataluren to achieve a nominal concentration of at least about 25 mg/mL in the total volume of suspension. In another aspect, reconstitution of a 500 mg unit dosage formulation ataluren is carried out by the addition of at least about 20 mL of water directly in a bottle containing ataluren to achieve a nominal concentration of at least about 25 mg/mL in the total volume of suspension. In another aspect, reconstitution of a 1000 mg unit dosage formulation ataluren is carried out by the addition of at least about 40 mL of water directly in a bottle containing ataluren to achieve a nominal concentration of at least about 25 mg/mL in the total volume of suspension.

In other aspects, a unit dosage form containing the pharmaceutical composition provided herein is only opened at the time of dose preparation. The full contents of each unit dosage form is mixed to a suspension with a liquid or a semi-solid solvating agent, wherein the liquid is at least 30 mL (1 ounce) or the semi-solid is at least 3 tablespoons. The prepared dose should be mixed well before being administered. The amount of the liquid or semi-solid solvating agent can be increased based on patient preference.

In certain aspects, the pharmaceutical composition provided herein comprises ataluren as a free acid or as a pharmaceutically acceptable salt, wherein the pharmaceutically acceptable salt is a magnesium salt, a potassium salt, a sodium salt, a tromethamine salt, an L-lysine salt, an L-arginine salt, an N-methyl glucamine salt or an L-histidine salt.

Particle Size

In certain aspects, the pharmaceutical compositions provided herein comprise a micronized form of ataluren having enhanced solubility. In certain aspects, the pharmaceutical compositions provided herein comprise a nanoparticle form of ataluren having enhanced solubility and/or dissolution rate.

In specific aspects, the pharmaceutical compositions provided herein comprise a micronized form of ataluren, wherein >90% of the particles of ataluren have a diameter ($D_{90}$ value) of between about 1-10 microns having enhanced solubility. In certain aspects, the pharmaceutical compositions provided herein comprise a micronized form of ataluren, having a $D_{90}$ value of about 10 microns, about 9 microns, about 8 microns, about 7 microns, about 6 microns, about 5 microns, about 4 microns, about 3 microns, about 2 microns or about 1 micron having enhanced solubility. In certain aspects, the pharmaceutical compositions provided herein comprise a micronized form of ataluren, having a $D_{90}$ value of between about 1-5 microns having enhanced solubility and/or dissolution rate. In certain aspects, the pharmaceutical compositions provided herein comprise a micronized form of ataluren, having a $D_{90}$ value of about 5 microns, about 4 microns, about 3 microns, about 2 microns or about 1 micron having enhanced solubility and/or dissolution rate. In certain aspects, the pharmaceutical compositions provided herein comprise a nanoparticle form of ataluren having enhanced solubility. In specific aspects, the pharmaceutical compositions provided herein comprise a nanoparticle form of ataluren, wherein >90% of the particles of ataluren have a $D_{90}$ value of about 0.1 microns, about 0.09 microns, about 0.08 microns, about 0.07 microns, about 0.06 microns, about 0.05 microns, about 0.04 microns, about 0.03 microns, about 0.02 microns or about 0.01 microns.

Provided herein are micronized forms of ataluren having a volume weighted mean diameter D[4.3] of from about 2 μm to about 12 μm. Also provided herein are micronized forms of ataluren having a surface weighted mean diameter D[3.2] of from about 1 μm to about 3 μm. Further provided herein are forms of ataluren having a $D_{90}$ particle size in the range of from about 5 μm to about 26 μm, having a $D_{50}$ particle size in the range of from about 1 μm to about 6 μm, or having a $D_{10}$ particle size in the range of from about 0.1 μm to about 1.5 μm.

Kits

The pharmaceutical compositions provided herein can be provided as an article of manufacture using packaging materials well known to those of skill in the art. Examples of pharmaceutical packaging materials include, but are not limited to, blister packs, bottles, packets, sachets, tubes, inhalers, pumps, bags, vials, containers, syringes, droppers, and any packaging material suitable for a selected formulation and intended mode of administration and treatment.

Provided herein are kits which, when used by the medical practitioner, can simplify the administration of appropriate amounts of the active ingredient to a subject. In certain aspects, the kit provided herein includes a container and a dosage form of a pharmaceutical formulation provided herein and instructions for use thereof. In certain aspects, the instructions included with the kit provide guidance with respect to the dosage amounts and/or dosing regimens for administration of ataluren.

In certain aspects, the kit includes a container comprising a dosage form of the pharmaceutical formulation provided herein, in a container comprising one or more other therapeutic agent(s) described herein. In certain aspects the pharmaceutical formulation is provided as a white to off-white powder for oral suspension. In certain aspects, the pharmaceutical formulation comprises a matrix and/or suspending agents, surfactants, and/or excipients. In certain aspects the pharmaceutical formulation is provided as granules for oral suspension. In certain aspects, the pharmaceutical formulation for oral suspension is packaged in aluminum-foil, child-resistant sachets (packets) in dose strengths containing 125, 250, or 1000 mg of the active drug substance. In certain aspects, the kit comprises packets or sachets comprising one or more dosage strengths of the pharmaceutical formulation for oral suspension (125, 250, or 1000 mg or matching placebo).

Kits provided herein can further include devices that are used to administer the active ingredient. Examples of such devices include, but are not limited to, syringes, needle-less injectors, drip bags, patches, droppers and inhalers.

Kits provided herein can further include pharmaceutically acceptable vehicles that can be used to administer the active ingredient. For example, if the active ingredient is provided in a solid form that must be reconstituted for parenteral administration, the kit can comprise a sealed container of a suitable vehicle in which the active ingredient can be dissolved to form a particulate-free sterile solution that is suitable for parenteral administration or can be reconstituted as a suspension for oral administration. Examples of pharmaceutically acceptable vehicles include, but are not limited to: aqueous vehicles including, but not limited to, Water for Injection USP, Sodium Chloride Injection, Ringer's Injection, Dextrose Injection, Dextrose and Sodium Chloride Injection, and Lactated Ringer's Injection; water-miscible vehicles including, but not limited to, ethyl alcohol, polyethylene glycol, and polypropylene glycol; and non-aqueous vehicles including, but not limited to, corn oil, cottonseed oil, peanut oil, sesame oil, ethyl oleate, isopropyl myristate, and benzyl benzoate.

Methods of Use

Ataluren is indicated for the treatment of Duchenne muscular dystrophy resulting from a nonsense mutation in the DMD gene, in ambulatory patients aged 2 years and older in the European Member States, Iceland, Lichtenstein, and Norway, or aged 5 years and older in Israel, Republic of Korea, Chile, and Ukraine; wherein, the presence of a nonsense mutation in the dystrophin gene should be determined by genetic testing. In contrast, evaluating the efficacy of any dystrophin restoration therapy in younger patients (e.g., less than 5 years of age) has been challenging due to the low number of patients diagnosed with nmDMD in this age range. Moreover, children under the age of 5, as a result of growth and maturation, tend to show stabilization or improvement of muscle function. Therefore, routine measures used to assess muscle function are less likely to detect beneficial drug effect.[14] There is also a lack of validated efficacy assessments in the ≥2 to <5 age group. In one example, assessments such as 6-minute walk distance (6 MWD), require cooperation from the patient and as such may not be amenable for use in young children.[14] Additionally, natural history data suggest that children with nmDMD in the ≥2 to <5 age group may also show improvement and/or stabilization in some of the measures routinely used to assess developmental muscle function such as TFTs.[14] In another example, for boys younger than four years of age, many of the functions in the North Star Ambulatory Assessment (NSAA), a commonly used functional assessment in nmDMD, are not yet reliably performed by typically developing boys, including functions such as standing on one leg and hopping.[18] By age three, 85% of typically developing boys are able to fully perform 8 of the 17 items in the NSAA (stand, walk 10 m, sit to stand from chair, climb step-Right Leg, climb step-Left Leg, get to sitting, jump, run) and 100% are able to perform 3 of these items (stand, walk 10 m, sit to stand from chair), whereas by age four, 85% of typically developing boys are able to perform, all 17 NSAA items. As such, revising the NSAA scales to include only items that can be reliably performed by boys in the ≥2 and <5-year old age group (i.e., 8- and 3-Item NSAA) is the most appropriate approach for functional assessment of this younger age group.[18]

Because dystrophin restoration therapy in young boys is likely to result in the greatest long-term benefit[16], the NCT02819557 phase 2, multiple dose open-label trial described herein was conducted to evaluate the safety and PK of ataluren in boys aged ≥2 to <5 years with nmDMD. Comparable safety and PK in this younger patient population may also support extrapolation of ataluren efficacy data and may help overcome some of the challenges associated with studying nmDMD treatments in younger children. The NCT02819557 trial only allowed for an evaluation of ataluren's impact on muscle function. Definitive assessments of ataluren efficacy could not be deduced since the feasibility of such studies is limited considering the intrinsic challenges of demonstrating efficacy in patients ≥2 to <5 years of age and the lack of a comparator group. While the TFTs and NSAA secondary endpoints used in the study described herein must be interpreted cautiously for patients in this age range, they are predictive for loss of function in nmDMD patients, including rate of and progression toward loss of ambulation.[19] Accordingly, TFTs and the NSAA are useful measures to assess drug benefit when other methods do not exist.

Due to the difficulty of evaluating efficacy in younger populations with rare genetic conditions, accepted practice suggests that PK and safety data obtained for a younger patient population, once shown to correlate to a comparable older patient population, would allow extrapolation of efficacy data from the older population. This comparison is an acceptable methodology and may be the only feasible way to demonstrate the benefit of a drug in the ≥2 to <5-year nmDMD patient population. The comparable plasma levels and safety of a drug, relative to those seen in older children, are a likely indication of comparable efficacy and a favorable benefit-risk profile in a younger population. In addition to PK and safety data, extrapolation of efficacy can be based on other factors, including use of the same study drug, comparable dose levels, mechanism of action, expected disease progression, and production of a measurable biomarker.

Limitations of the NCT02819557 study included a small sample size and the lack of a comparator group for formal efficacy assessments. The use of sparse PK sampling, recommended in a younger patient population, paired with use of a population PK analysis limited the extent to which PK parameters could be calculated using conventional methods. Moreover, efficacy assessments for the population in question (nmDMD patients in the range of 2-5 years of age) must also be interpreted cautiously since children in this age group are expected to improve and/or begin to stabilize their motor function over this time. Thus, it is unclear how much functional improvement can be attributable to ataluren therapy.[14] Further, the TFT and NSAA results described herein suggest a benefit of ataluren therapy in younger patients with nmDMD, shown in data obtained at 28 and 52 weeks of ataluren treatment. The effect of ataluren treatment demonstrated by the TFT results described herein, related to time to: 1). Descend 4 stairs, 2). Climb 4 stairs, 3). Stand from supine, and 4). Walk/run 10 meters each showed overall improvements from baseline over the length of the study period. In addition, the mean 16-item NSAA score showed improvement over baseline, with similar improvements seen in the NSAA 8-, and 3-item Assessments, albeit to a lesser degree due to a ceiling effect in the latter Assessments.

In the instant nmDMD patient population, attaining an optimal plasma concentration range of ataluren in patients ≥2 yrs and <5 yrs is expected to demonstrate similar long term therapeutic benefits as observed in patients ≥5 yrs. Accordingly, by comparing the safety and PK results for ataluren in the younger patient population (≥2 yrs and <5 yrs), as obtained in this study, with the safety and PK results for ataluren obtained from older nmDMD populations (≥5 yrs) in earlier studies, the likelihood of efficacy for the younger population can be extrapolated.

Since treatment options are lacking for the younger nmDMD patient population, it is expected that extrapolation of ataluren safety, efficacy and PK results from the older nmDMD patient population may indicate that dystrophin restoration therapy for the younger nmDMD patient population could ensure functionality is maintained for a longer period of time despite the inexorable functional decline associated with DMD and thus fulfill an urgent unmet medical need.

Examples

The comparison of safety, efficacy and PK results for ataluren obtained from the older nmDMD populations (≥5 yrs) in earlier studies, is a statistically acceptable means to demonstrate the likelihood for efficacy for the younger nmDMD population (≥2 to <5 yrs) based on safety and PK results obtained for the younger nmDMD population.

The plasma levels and safety of ataluren in the younger population, relative to those seen in older children, were determined to be similar. Accordingly, comparable efficacy and benefit-risk profile may be expected. Limitations of the instant study were a small sample size and the lack of a comparator group for formal efficacy assessments. The use of initial PK (as sampled at 0, 1, 2, 4, 6, 8, 10 hours), followed by population PK analysis (to determine average plasma concentration based on estimated exposure over a 24 hour period) limited the PK parameters which could be calculated using conventional methods. In any case, any efficacy assessment for a pediatric nmDMD population must be balanced with the developmental milestones patients in this age group are expected to achieve as motor function begins to stabilize during these earlier years. Accordingly, such concurrent factors must be assessed (as in the TFT and NSAA results described and shown herein) in view of the inevitably progressive compromise in motor function experienced as the younger patients age.

Pediatric patients, as described below, were examined for safety and PK related to treatment with ataluren according to the NCT02819557 clinical trial briefly described in Table I, below:

TABLE 1

Clinical Protocol Synopsis

| Aspect | Summary |
| --- | --- |
| Phase: | Phase 2 Study of ataluren in ≥2 to <5 Year-Old Males With Duchenne Muscular Dystrophy |
| Study Duration: | 52 week study period: having a 4 week initial treatment period with administration of ataluren for PK sampling, followed by a 48 week treatment period with ataluren |
| Objectives: | The primary objective of the NCT02819557 study was to characterize the pharmacokinetics (PK) and long term safety profile of ataluren in pediatric patients with nmDMD |
| Diagnosis and Main Inclusion Criteria: | Age ≥2 years old and <5 years old, male, with a weight ≥12 kg at Week 0 and a diagnosis of DMD based on an elevated serum creatine kinase (CK) test and genotypic evidence of dystrophinopathy. Documentation of the presence of a nonsense mutation in the DMD gene, with verification of blood sample for DMD sequencing, was also required for study participation. |
| Study Drug, Dose, Route, Regimen: | Ataluren (granules for suspension) Dose: 3 times daily (10 mg, 10 mg and 20 mg/kg morning, midday and evening, respectively) Titration: None Maximum dose: 3 times daily (10 mg, 10 mg, 20 mg/kg morning, midday and evening respectively) |
| Duration of administration: | Each patient received a total of 52-weeks of active drug (ataluren) (including 4 weeks during the PK portion of the study and 48 weeks during the extension period); the extension period was designed to assess the long-term safety and efficacy of ataluren in this patient population, during which timeframe patients provided NSAA information for further functional benefit analysis. |

Study Drug

The study drug ataluren used in this study was in the form of a white to off-white powder/granules for suspension packaged in child-resistant aluminum foil packets or sachets. Each packet or sachet contained the drug substance as 25% of the total formulation weight.

Study Design

A total dose of 40 mg/kg/day study drug was administered as three divided doses per day. The first dose administered was: 10 mg/kg in the morning, the second dose administered was 10 mg/kg at midday, and the third dose administered was 20 mg/kg in the evening.

Dosing was based on the patient's body weight at baseline. Weight was assessed at every clinic visit. If the patient's body weight changed by ≥10% from baseline, the actual dose was re-calculated.

The first dose of study drug was administered in the clinic and the date and time of administration was recorded. Dosing was continued for 4 weeks during the PK portion of the study, and for an additional 48 weeks during the extension period. The extension period was designed to assess the long-term safety and efficacy of ataluren in this patient population.

Evaluations included blood sampling for gene sequencing, blood sampling for ataluren PK, vital signs, height, weight, physical exam, hematology urinalysis, 12-lead ECG, palatability questionnaire, adverse events (AEs), concomitant medications and non-DMD-related Aes. For single-dose and steady-state plasma concentrations, blood samples were collected pre-dose and at 1, 2, 4, 6, 8, and 10 hours post-dose on Days 1 (Visit 2) and 28 (Visit 3). Ataluren plasma concentrations were determined using a validated liquid chromatography with tandem mass spectrometry (LC-MS/MS) method, with a lower limit of quantification (LOQ) of 0.500 µg/mL. Efficacy evaluations included TFTs and the NSAA, adapted as described below.

Treatment Regimen

Patients received 52 weeks of ataluren as described above. Each patient started at a dose based on their weight in kilograms. The study drug was administered TID, with a 10 mg/kg dose in the morning, a 10 mg/kg dose at midday and a 20 mg/kg dose in the evening. The dose was administered based on patient weight from a combination of unit dose packages selected from one or more foil packets or sachets containing 125, 250, or 1000 mg of study drug.

Dosing was based on the patient's body weight at baseline. Weight was assessed at every clinic visit. If the patient's body weight changed by ≥10% from baseline, the dose to be administered was re-calculated.

Each dose was taken within ~30 minutes after a meal. Intervals for dosing were about 6 hours (±1 hour) between the morning and mid-day doses, about 6 hours (±1 hour) between the mid-day and evening doses, and about 12 hours (±1 hour) between the evening dose and the morning dose on the next day. Each prepared dose was administered immediately after preparation. The prepared dose was to be discarded if not consumed within 24 hours of preparation if kept refrigerated (2 to 8° C.), or within 3 hours at room temperature (15 to 30° C.). The clinic staff instructed each patient or parent/caregiver on the specific number of sachets to be taken from each kit for each dose and provided detailed oral directions regarding drug preparation. In addition, detailed written drug mixing and dosing instructions were provided to the patient or parent/caregiver when drug supplies were dispensed.

Statistical Considerations

The target sample size of 12 patients for this study was not based on formal statistical considerations. Preliminary results from a population PK simulation indicated that the study design (sample size and sparse sampling strategy) would provide adequate precision for the prediction of PK parameters (CL/F and Vd/F), even with the usual potential for subject dropouts and/or missing samples.[20,21]

Observed values of plasma concentrations for ataluren were summarized at each visit and time point by dose level. Descriptive statistics (n, mean, standard deviation [SD], coefficient of variation [CV %], median, minimum, and maximum) and geometric means and their CV % were calculated. PK parameters ($AUC_{0-6}$, $AUC_{0-10}$, $C_{max}$ (0-6 hr) Ctrough (0-6 hr), t max (0-6 hr), accumulation ratio (AR) (AUC), AR ($C_{max}$)) were derived using actual sampling and dosing times. Concentrations below the LOQ were set to zero for the calculation of non-compartmental analysis (NCA) parameters.

For timed function tests (TFTs), results summarizing the baseline values (Study Day 1), post-baseline values, and the change from baseline values were analyzed separately for each of the 4 tests, including time taken to i). walk/run 10 meters, ii). Climb 4 stairs, iii). Descend 4 stairs, and iv). Stand from a supine position. The 10 m walk/run test was assessed once. If the time taken to perform a TFT exceeded 30 seconds or if a subject could not perform a TFT due to disease progression, a value of 30 seconds was set for the summary analysis. The time values in seconds were summarized using descriptive statistics: n, mean, SD, median, range, and 95% confidence intervals. Observed values, and changes from baseline in TFTs were summarized accordingly for the evaluable population.

Certain assessments on the NSAA 16-point scale were revised to reflect developmental stages for a pediatric patient population, e.g., "Lifts Head" was removed from the total, Items 3 and 8 on the NSAA scales were further revised to detect changes in the pediatric younger age group.[18,22] The same analysis was used for all subjects (n=14).

Results

A total of 14 pediatric patients having nmDMD were screened and enrolled; all were included in the safety, PK, and evaluable populations, and all completed the study, including the PK and extension phases. All subjects were male with a mean age of 3.4 years (range 2 to 4 years); six (42.9%) of the subjects were taking corticosteroids at baseline. The dosing of ataluren was based on milligrams (mg) of drug per kilogram (kg) of patient body weight, assessed every 12 weeks. All patients were administered the 40 mg/kg/day dose of ataluren, in three daily doses of 10-, 10-, and 20-mg/kg in the morning, midday and evening, respectively, for 4 weeks during the PK portion of the study, and for 48 weeks during the extension period. The extension period was designed to assess the long-term safety and efficacy of ataluren in this patient population. The results obtained provided the necessary assessments of safety, PK, and potential clinical benefit of ataluren, administered over a 52-week period, in this pediatric population.

Existing Population Pharmacokinetic Model

The Expanded Model (2013/2014) was fit to a time-ordered dataset including the data from Studies 026 and 030 pooled with the data previously used to develop the model (excluding data from patients with nmCF).[23] The population PK analysis from 2013/2014 found that the most robust fit to the pooled data from healthy adults, nmDMD patients, and nmCF patients was achieved using a two-compartment model with first order absorption and linear clearance. Absorption rate was dependent on dose and relative bioavailability was dependent on time (decreasing with time), formulation (Day 1), or disease state (at steady-state). Apparent oral clearance and volume of the central compartment were related to body weight and the effect of diurnal variation was included on clearance. This model is referred herein as the "nmDMD Relative F Model (2017)" and is considered the final population PK model for healthy volunteers and children aged 2 and above with nmDMD.

Comparison of Steady-State Exposures using the nmDMD Relative F Model (2017) and the nmDMD Clearance Model (2017)

In order to assess the sensitivity of the predicted ataluren exposures in patients with nmDMD, post-hoc estimates of $AUC_{0-24}$, $C_{ave}$, and $C_{max}$ were calculated using both models: the nmDMD Relative F Model (2017) and the nmDMD Clearance Model (2017). As shown in Table 2, there was a trend for the competing model to predict lower exposure on Day 1 and higher exposure at steady-state. While it is not possible to definitely assess which model is providing the more accurate exposures, it is important to note that the differences in exposure predicted from the two models are relatively small overall. Therefore, the overall distribution of $C_{ave}$ is not dramatically different at steady-state when comparing the two models.

TABLE 2

Percent Difference in Individual Estimates of Exposure

| | | | Median ($5^{th}$-$95^{th}$) for percent difference between methods | | |
|---|---|---|---|---|---|
| Regimen | Study | Occasion | $AUC_{0-24}$ | $C_{ave}$ | $C_{max}$ |
| 10:10:20 | 4 | Day 1 | −0.0332 | −0.0332 | −6.10 |
| | | | (−6.65-8.56) | (−6.65-8.56) | (−14.5-6.46) |
| 10:10:20 | 7 | Day 1 | −18.4 | −18.4 | −33.8 |
| | | | (−33.5--3.08) | (−33.5--3.08) | (−44.6--23.8) |
| 10:10:20 | 30 | Day 1 | 0.303 | 0.303 | −9.99 |
| | | | (−7.31-7.18) | (−7.31-7.18) | (−17.6--2.72) |
| 10:10:20 | 4 | Steady-state | −3.61 | −3.61 | 2.45 |
| | | | (−8.40-5.73) | (−8.40-5.73) | (−7.29-21.1) |

TABLE 2-continued

Percent Difference in Individual Estimates of Exposure

| | | | Median ($5^{th}$-$95^{th}$) for percent difference between methods | | |
|---|---|---|---|---|---|
| Regimen | Study | Occasion | $AUC_{0-24}$ | $C_{ave}$ | $C_{max}$ |
| 10:10:20 | 7 | Steady-state | 33.5 (26.2-43.9) | 33.5 (26.2-43.9) | 22.2 (9.70-36.4) |
| 10:10:20 | 30 | Steady-state | 12.2 (4.28-22.9) | 12.2 (4.28-22.9) | 30.9 (11.5-54.6) |
| 20:20:40 | 4 | Day 1 | −6.74 (−8.90-1.02) | −6.74 (−8.90-1.02) | −10.4 (−27.5-−1.55) |
| 20:20:40 | 7 | Day 1 | −17.0 (−24.8-−1.73) | −17.0 (−24.8-−1.73) | −25.5 (−35.1-−16.6) |
| 20:20:40 | 4 | Steady-state | 25.4 (13.1-29.7) | 25.4 (13.1-29.7) | 36.2 (16.2-40.7) |
| 20:20:40 | 7 | Steady-state | 29.8 (22.1-38.5) | 29.8 (22.1-38.5) | 24.9 (14.1-38.0) |
| 4:4:8 | 4 | Day 1 | 0.847 (−1.95-4.57) | 0.847 (−1.95-4.57) | −12.0 (−19.1-−3.11) |
| 4:4:8 | 4 | Steady-state | −3.59 (−9.31-5.15) | −3.59 (−9.31-5.15) | −0.981 (−11.5-13.7) |

Note:
Abbreviations are provided in the Abbreviation Listing.

Pharmacokinetics

The Mean (SD) plasma ataluren concentration-time profiles are provided in Table 3. The profiles followed a similar pattern on Day 1 and Day 28, with peak concentrations seen at approximately 2 hours post-morning dose, and 8 hours post-morning dose (i.e., 2 hours post midday dose), for most subjects. The second dose of ataluren was administered 6 hours after the first dose. As shown in Table 3, the values of several PK parameters were similar across visits and supported a lack of drug accumulation across doses, where AUC is provided as (hr*µg/mL), plasma concentration as (µg/mL), t max (0-6 hr) as (hr) and Accumulation Ratios (AR) for $AUC_{0-6}$ and C max (0-6 hr) were 0.99 and 1.02, respectively, indicating no apparent accumulation.

TABLE 3

Ataluren Plasma Pharmacokinetic Results

| Statistics by Visit | $AUC_{0-6}$ | $AUC_{0-10}$ | $C_{max}$ | $C_{trough-6\,hr}$ | $t_{max}$ | AR $AUC_{0-6}$ | AR $C_{max}$ |
|---|---|---|---|---|---|---|---|
| WEEK 0 - DAY 1 | | | | | | | |
| n | 14 | 14 | 14 | 14 | 14 | N/A | N/A |
| Arithmetic Mean | 53.03 | 101.64 | 15.95 | 9.12 | 3.84 | N/A | N/A |
| SD | 30.18 | 58.52 | 9.51 | 8.88 | 1.82 | N/A | N/A |
| Arithmetic CV % | 56.91 | 57.58 | 59.60 | 97.34 | 47.45 | N/A | N/A |
| Minimum | 20.67 | 34.94 | 6.44 | 1.47 | 1.92 | N/A | N/A |
| Maximum | 112.32 | 232.60 | 37.90 | 32.00 | 6.02 | N/A | N/A |
| WEEK 4 - DAY 28 | | | | | | | |
| n | 14 | 14 | 14 | 14 | 14 | 14 | 14 |
| Arithmetic Mean | 43.63 | 82.13 | 12.54 | 5.43 | 2.72 | 0.99 | 1.02 |
| SD | 14.65 | 27.43 | 4.43 | 3.15 | 1.98 | 0.47 | 0.64 |
| Arithmetic CV % | 33.57 | 33.40 | 35.35 | 58.09 | 72.90 | 47.60 | 62.40 |
| Minimum | 11.91 | 26.24 | 4.91 | 1.79 | 1.00 | 0.37 | 0.25 |
| Maximum | 66.79 | 137.09 | 20.50 | 9.98 | 6.05 | 2.07 | 2.71 |

Pharmacokinetic Results

Ataluren PK were calculated for all 14 subjects. Data for $AUC_{0-6}$, $AUC_{0-10}$, $C_{max}$ (0-6 hr), $C_{trough@6h}$, and $t_{max}$ (0-6 hr) were provided for Visit 2 and Visit 3. Mean plasma concentration-time curves followed a similar pattern at both PK visits. The accumulation ratios for $AUC_{0-6}$ and $C_{max}$ were 0.99 and 1.02, respectively.

Efficacy Assessment

Assessment of ataluren efficacy following 28 and 52 weeks of treatment is shown in the Figures. Treatment with ataluren showed an improvement in timed function tests from baseline at weeks 28 and 52. In these analyses, one patient did not complete any TFTs at week 28 and therefore was not included in any of the week 28 TFT analyses. In addition to this patient, a second patient did not have a baseline time for the 4-stair descend and was not included in either the 28- or 52-week 4-stair descend analysis.

Functional results were obtained in the study as shown in FIGS. 1A, 1B, 1C and 1D. As shown in FIG. 1A, the mean time taken to descend 4 stairs (SD) decreased by 0.6 (±1.93) seconds from a mean baseline of 7.1 seconds at week 28 among the 12 patients included in this analysis, and 2.2 (±2.58) seconds from a mean baseline of 7.5 seconds at week 52 among the 13 patients included, respectively.

Comparison of results from weeks 28 and 52 indicates to a respective mean percent improvement (SD) of 7.17 (±26.43) percent and 24.22 (±28.32) percent, respectively.

Figure 1B:
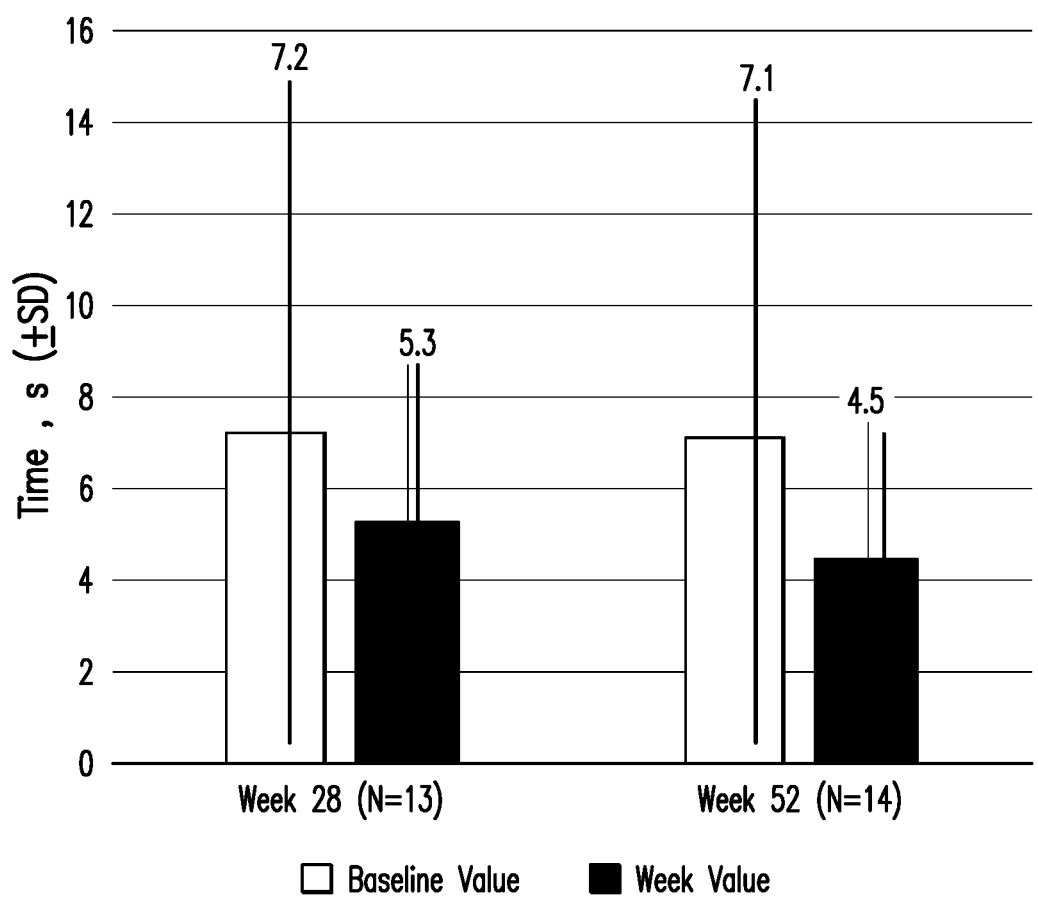
FIG. 1B shows the difference in the mean time to accomplish the timed function test of climbing 4 stairs at baseline and at weeks 28 and 52.

As shown in FIG. 1B, the mean time to climb 4 stairs was reduced by 1.8 (±4.85) seconds and 2.6 (±5.0) seconds at weeks 28 (N=13) for the 13 patients from whom data were collected, and 52 (N=14) for the 14 patients from whom data were collected, respectively. Comparison of results from weeks 28 and 52 indicates to a respective mean percent improvement (SD) of 9.10 (±29.63) percent and 23.36 (±26.25) percent, respectively.

Figure 1C:
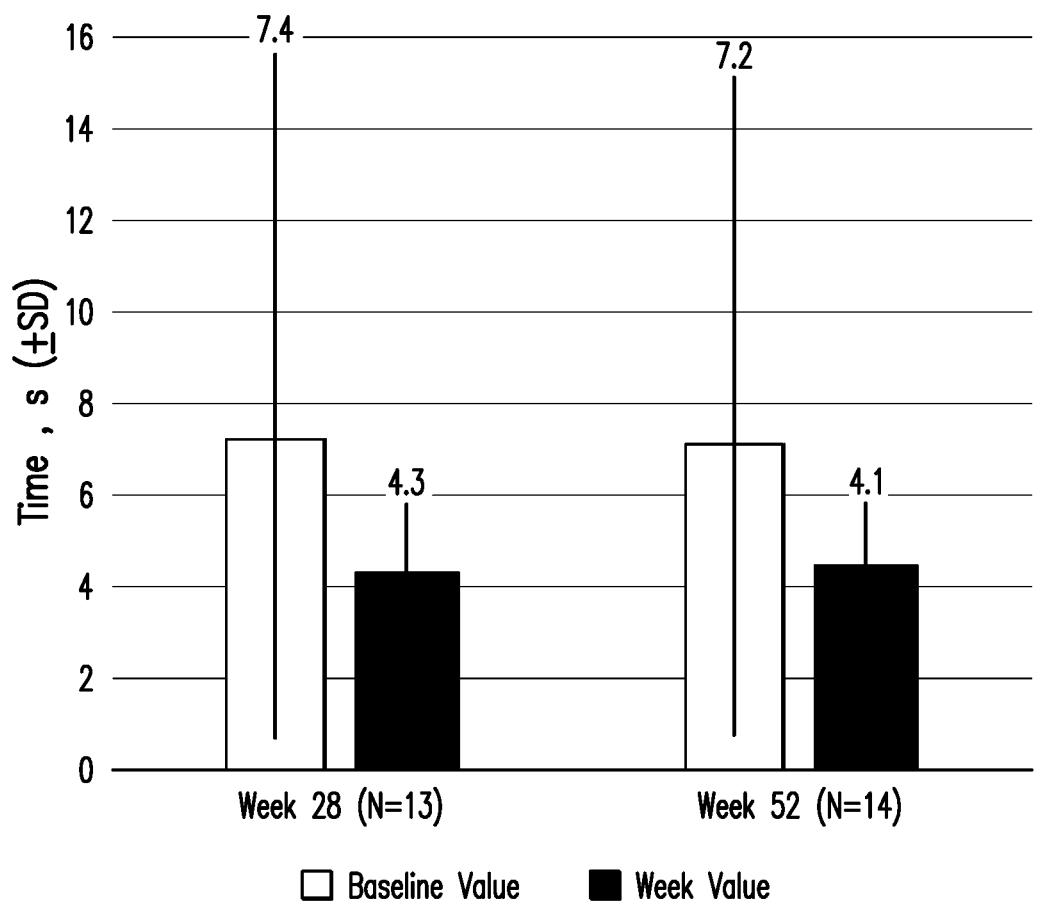
FIG. 1C shows the difference in the mean time to accomplish the timed function test of standing from supine at baseline and at weeks 28 and 52; and, FIG. 1D shows the difference in the mean time to run/walk 10 meters at baseline and at weeks 28 and 52.

As shown in FIG. 1C, mean improvement from baseline in the stand from supine position assessment were similar among the patients assessed at weeks 28 (N=13) and the patients assessed at week 52 (N=14).

Figure 1D:
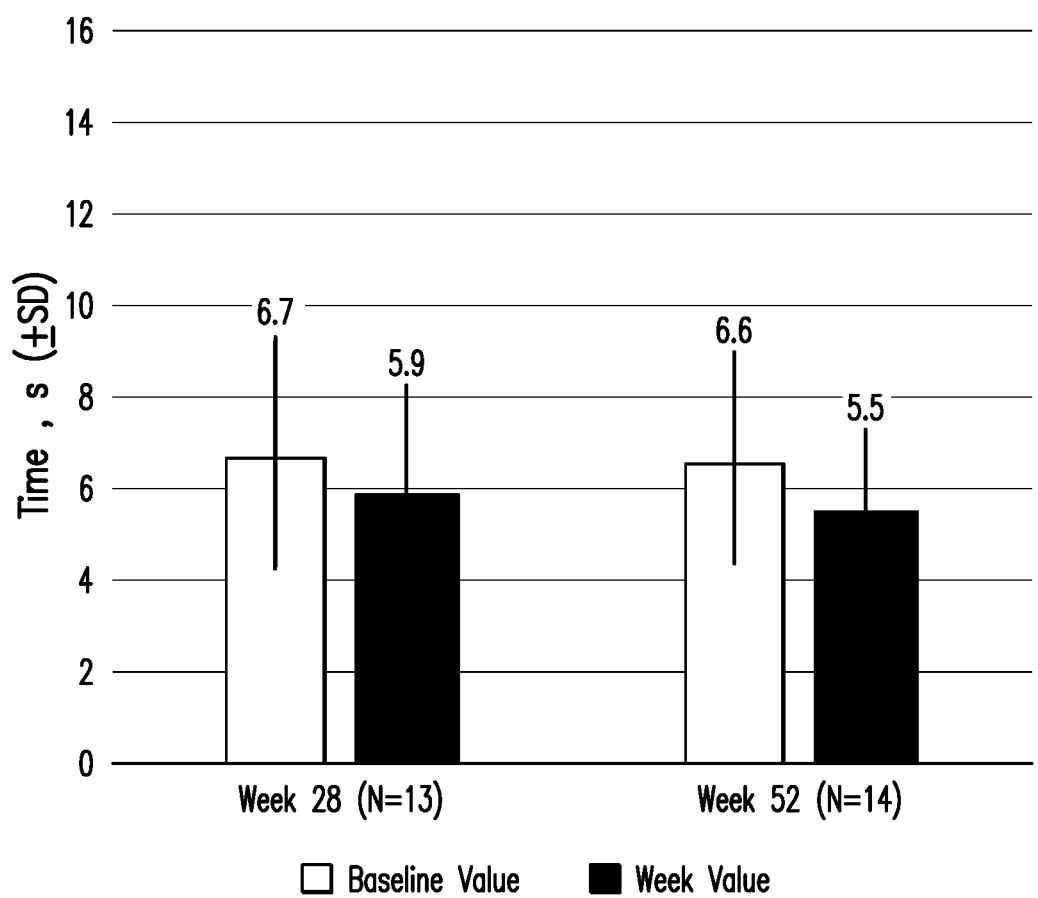

As shown in FIG. 1D, the mean time for the 10 m walk/run assessment at baseline was 6.7 (±2.46) seconds among the 13 patients evaluated and showed mean reductions from baseline values of 0.8 (±1.54) seconds at weeks 28 and 1.1 (±1.35) seconds for the 14 patients assessed at week 52, respectively. Comparison of results from weeks 28 and 52 indicate a respective mean percent improvement of 8.35% at Week 28 and 14.54% at Week 52.

Figure 2A:
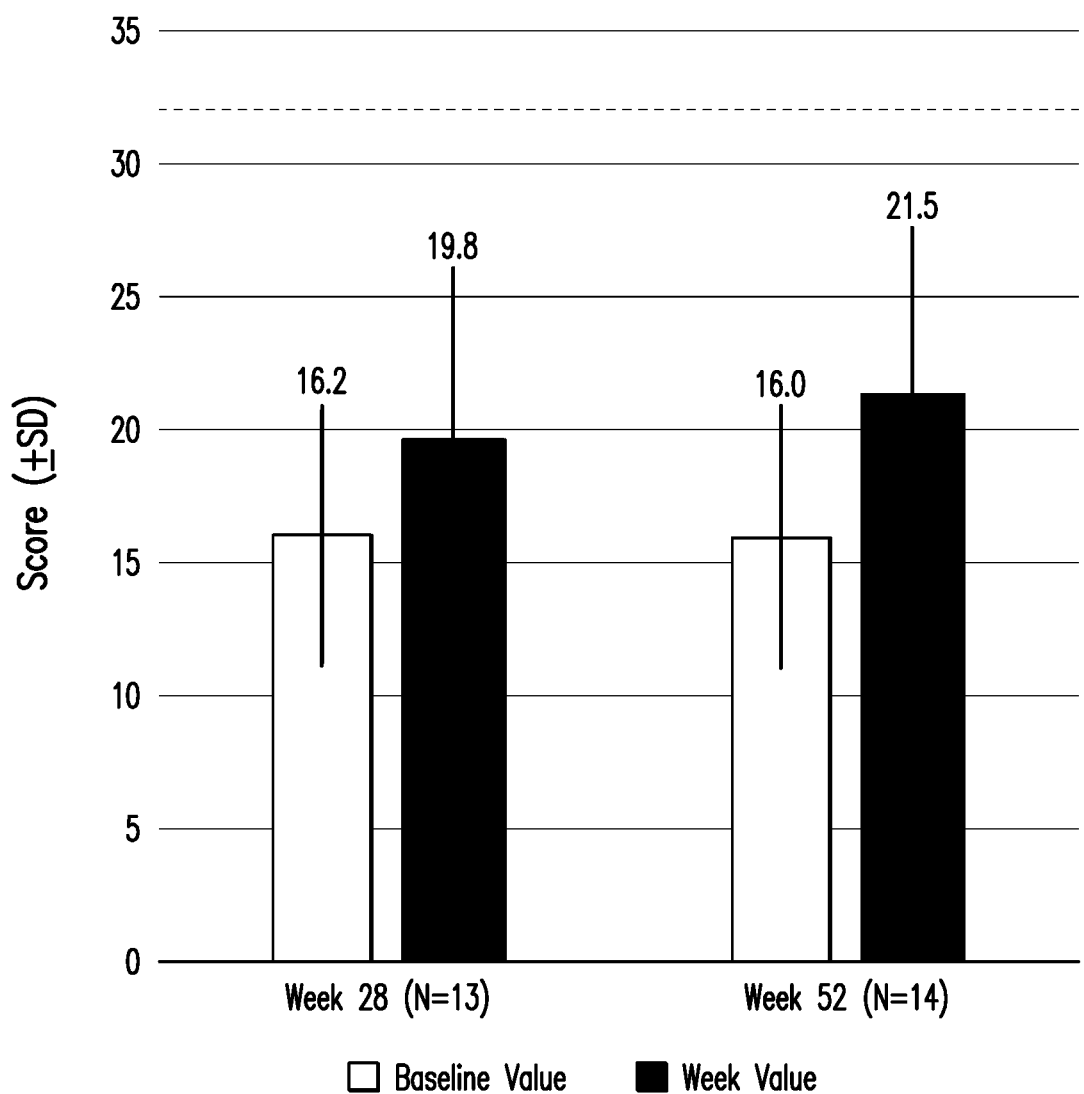
FIG. 2A shows results for the 16-item NSAA (Northstar Ambulatory Assessment)
Figure 2B:
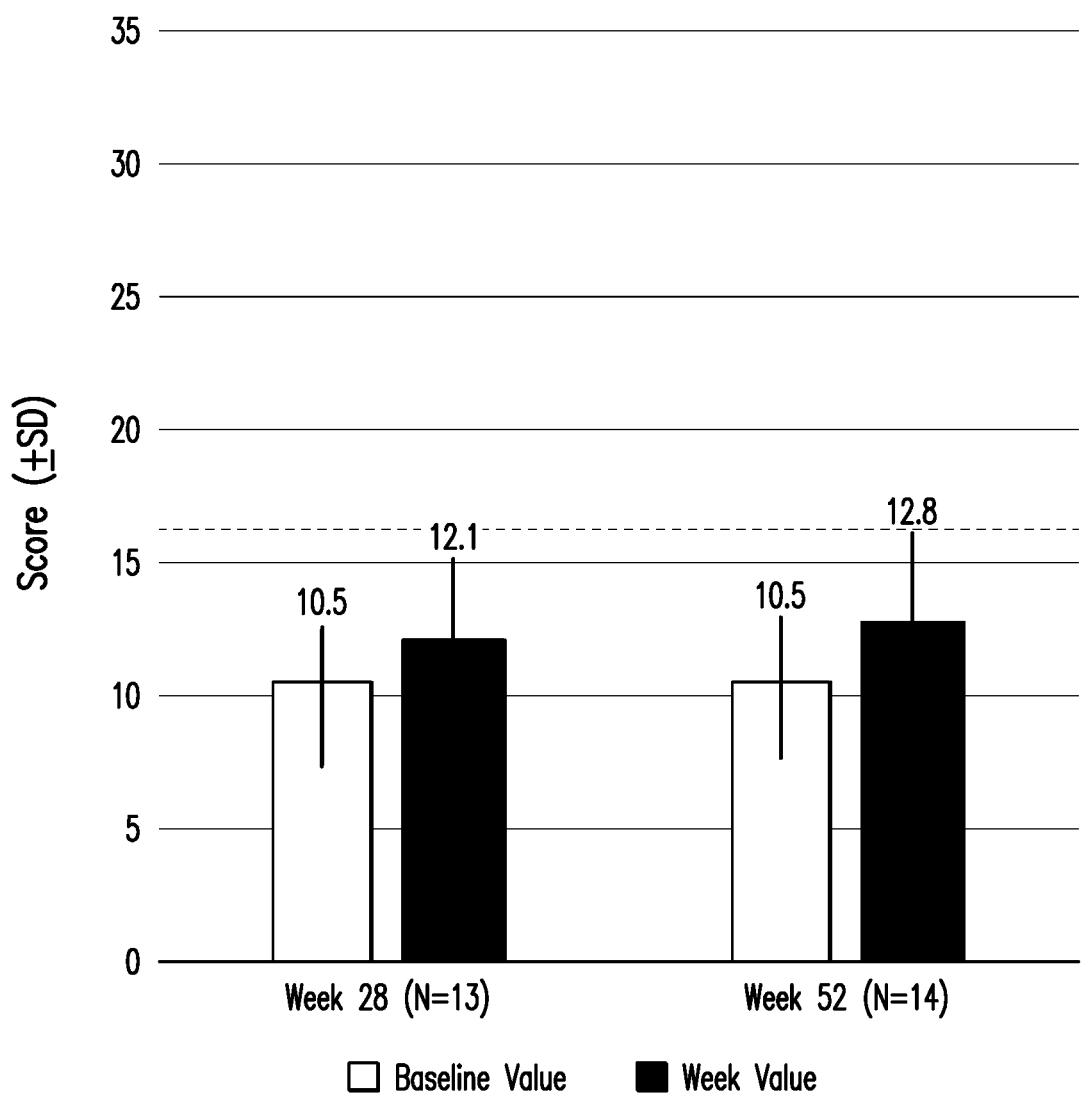
FIG. 2B shows results for the 8-item NSAA.
Figure 2C:
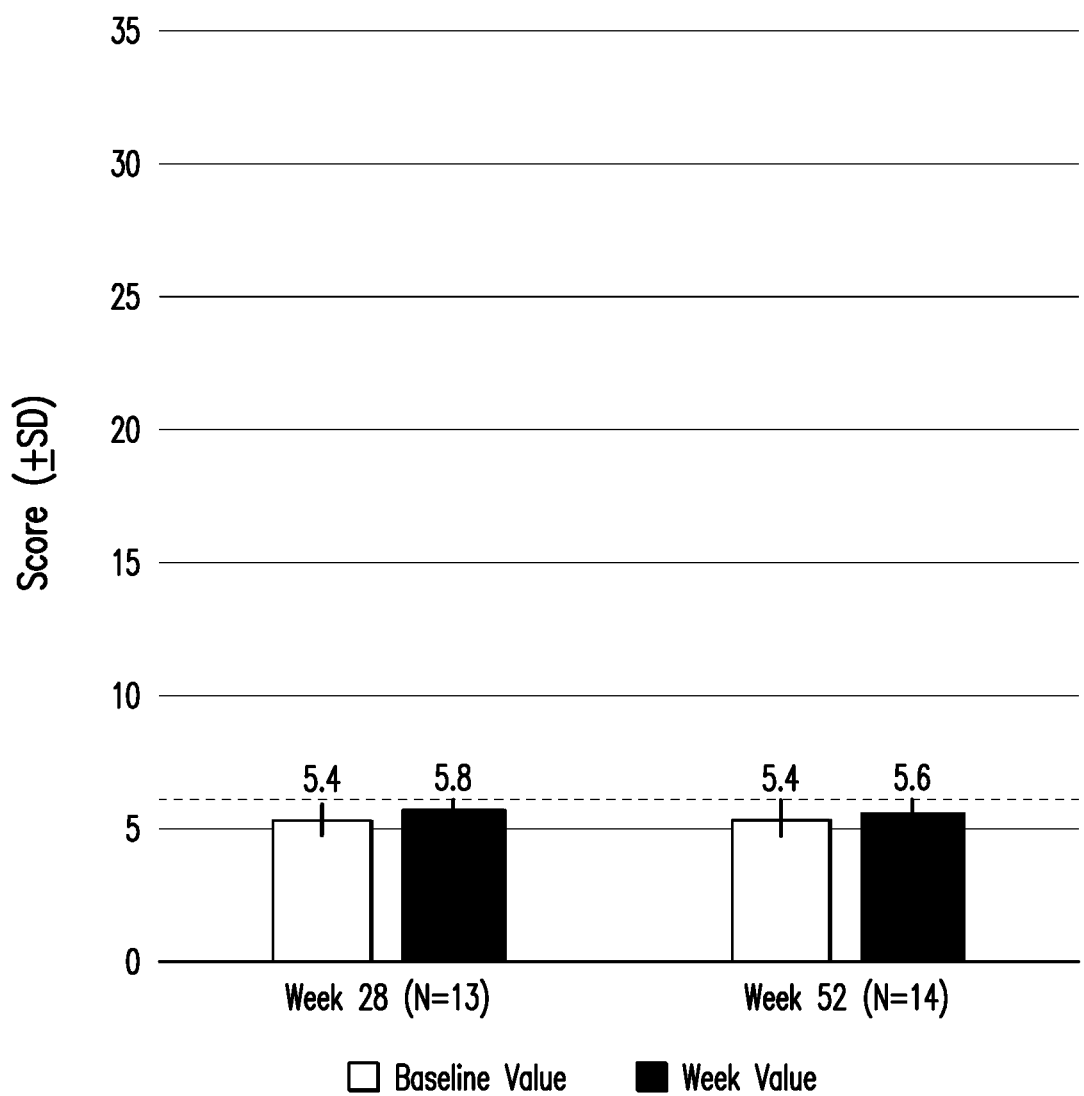
FIG. 2C shows results for the 3-item NSAA. The mean (SD) value for the 3-item NSAA total score at Week 28 (n=13) was 5.8 (±0.38), an improvement of 10.26% over the baseline value of 5.4 (±0.65).

North Star Ambulatory Assessment (NSAA) results were obtained in the study as shown in FIGS. 2A, 2B and 2C. Similar for results discussed in the TFT analyses, a patient who did not complete the NSAA at week 28 was excluded from the analysis. However, all patients were included in the baseline and week 52 assessments.

As shown in FIG. 2A, results for the 16-item NSAA obtained at Week 28 and 52 were compared. The mean (SD) value for the NSAA total score at Week 28 was 19.8 (±6.17) (N=13) for the 13 patients from whom data were collected, an improvement of 3.5 (±3.43) points, or 24.88% over the baseline value of 16.2 (±4.76). The mean (SD) value for the NSAA total score at Week 52 was 21.5 (±6.48) (N=14) for the 14 patients from whom data were collected, an improvement of 5.5 (±4.43) points or 36.63% over the baseline value of 16.0 (±4.66).

As shown in FIG. 2B, results for the 8-item NSAA obtained at Week 28 and 52 were compared. The mean (SD) value for the 8-item NSAA score at Week 28 was 12.1 (+3.12) (N=13), an improvement of 15.14% over the baseline value of 10.5 (±2.67). The mean (SD) value for the 8-item NSAA score at Week 52 was 12.8 (+3.12) (N=14), an improvement of 23.31% over the baseline value of 10.5 (±2.56).

As shown in FIG. 2C, results for the 3-item NSAA obtained at Week 28 and 52 were compared. The mean (SD) value for the 3-item NSAA score at Week 28 was 5.8 (±0.38) (N=13), an improvement of 10.26% over the baseline value of 5.4 (±0.65). The mean (SD) value for the 3-item NSAA score at Week 52 was 5.6 (+0.63) (N=14), an improvement of 6.31% over the baseline value of 5.4 (±0.63).

Efficacy Results

All Timed Function Test assessments showed overall improvements from baseline.

The mean (SD) time taken to descend 4 standard stairs decreased by 7.17 (26.433) percent and 24.22 (28.322) percent at Week 28 (Visit 5) and Week 52 (Visit 7), respectively. A similar trend was seen for the stair climbing test, which demonstrated mean (SD) improvements of 9.10 (29.630) percent and 23.36 (26.249) percent at Week 28 and Week 52, respectively.

Improvements in the stand from supine position assessment were similar at Week 28 and Week 52. The ten meter run/walk assessment showed mean (SD) improvements at of 8.35 (22.778) percent at Week 28 and 14.54 (14.862) percent at Week 52. Improvements were seen in mean (SD) 16-item NSAA total score over the baseline value of 16.0 (4.66).

The mean (SD) value for the total score at Week 28 was 19.8 (6.17), an improvement of 24.88 (27.203) percent. The mean (SD) value for the total score at Week 52 was 21.5 (6.48), an improvement of 36.63 (29.956) percent.

Similar improvements were seen with the 8-item and 3-item NSAA subscales to a lesser degree. In terms of palatability characteristics, 10 (71.5%) of the respondents either agreed or strongly agreed that the medication was pleasant based on the child's reaction, while 2 (14.3%) disagreed. Only 2 (14.3%) respondents reported having problems giving the medication to the patient.

Pediatric patients, as described below, may be examined for safety and PK related to treatment with ataluren according to a clinical trial briefly described in Table 2, below:

TABLE 2

Clinical Protocol Synopsis

| Aspect | Summary |
| --- | --- |
| Phase: | Phase 2 open-label study evaluating the safety and pharmacokinetics of ataluren in male children aged ≥6 months to <2 years old with nonsense mutation Duchenne Muscular Dystrophy (nmDMD) in patients aged 6 months and older. |
| Objectives: | Primary. To assess safety and tolerability of ataluren in children aged ≥6 months to <2 years old<br>Secondary.<br>To assess ataluren pharmacokinetics (PK) in children aged ≥6 months to <2 years old<br>To monitor physical and motor development |
| Study Endpoints: | Primary:<br>Overall safety profile<br>Secondary:<br>PK assessment including area under the concentration curve (AUC), time to maximal plasma concentration ($T_{max}$), maximal concentration ($C_{max}$), half-life ($t_{1/2}$) if feasible, will be conducted on Day 1, Week 4, and at the end of study (Week 52). Frequent blood sampling after each dose will be employed.<br>Other<br>Abnormalities of physical findings, laboratory tests, or electrocardiograms (ECGs). |

TABLE 2-continued

Clinical Protocol Synopsis

| Aspect | Summary |
|---|---|
| | Physical and motor development assessments based on the Bayley Scales of Infant and Toddler Development. |
| Sample Size: | 6 subjects |
| Methodology/ Study Design | This is a phase 2, open-label study to evaluate safety, tolerability, physical and motor development, and PK in children aged ≥6 months to <2 years treated daily for 52 weeks with orally administered ataluren 10, 10, 20 mg/kg (morning, mid-day, and evening dose, respectively). The study will include three PK profile assessments (at baseline [Visit 1], Week 4 and end of study [Week 52/Early Termination]). PK parameters will be investigated based on frequent blood sampling and occur at pre-dose, and 1, 2, 3, and 4 hours post-dose following the morning and mid-day ataluren doses, and at pre-dose, 1, 2, 3, 4 and 12 (before the next day dose) hours after the evening ataluren dose. Safety evaluations will include AEs, SAEs, AEs leading to discontinuation, laboratory evaluations, ECG, vital signs, physical examination. PK parameters will include $AUC_{0-24}$, $T_{max}$, $t_{1/2}$, $C_{max}$, $C_{trough}$, and CL/F and Vc/F if applicable. |
| Main inclusion criteria | 1. Males ≥6 months to <2 years of age<br>2. Body weight ≥7.5 kg<br>3. Diagnosis of DMD based on an elevated serum creatine kinase (CK) and genotypic evidence of dystrophinopathy. Medical documentation of phenotypic evidence of dystrophinopathy needs to be provided upon request by the PTC Therapeutics medical monitor.<br>4. Documentation of the presence of a nonsense mutation of the dystrophin gene.<br>5. Verification that a blood sample was drawn for sequencing of the dystrophin gene. |
| Main Exclusion Criteria: | 1. Prior and concomitant use of corticosteroids.<br>2. Ongoing use of the following drugs:<br>Systemic aminoglycoside therapy and/or IV vancomycin.<br>Coumarin-based anticoagulants (eg, warfarin), phenytoin, tolbutamide, or paclitaxel.<br>Inducers of UGT1A9 (e.g. rifampicin), or substrates of OAT1 or OAT3 (e.g. ciprofloxacin, adefovir, oseltamivir, aciclovir, captopril, furosemide, bumetanide, valsartan, pravastatin, rosuvastatin, atorvastatin, pitavastatin). |
| Study Treatment: | Ataluren treatment is weight-based and will comprise daily administration of ataluren with a dosing regimen of 10, 10, 20 mg/kg TID for 52 weeks. Three doses should be taken per day - the first dose in the morning (10 mg/kg), the second dose mid-day (10 mg/kg), and the third dose in the evening (20 mg/kg). Study Drug Description: Ataluren will be provided as a white to off white granules for oral suspension. The granules for oral suspension are packaged in aluminum foil sachets and supplied in dose strengths containing 125 or 250 mg of the active drug substance. Study Drug Storage and Preparation: Entire content of the sachets: Study drug sachets should be stored at labeled storage conditions until time of reconstitution. For administration, the powder in the sachet may be mixed with water, milk (skim, 1% fat, 2% fat, whole milk, or lactose free milk), breast milk, fruit juice (except apple juice), or fruit punch, or in semi-solid food (yogurt, pudding, or applesauce). The full contents of each packet should be well-mixed with at least 30 mL (1 ounce) of liquid, or 3 tablespoons of semi-solid food. The reconstituted ataluren suspension may be kept for up to 24 hours under refrigeration. Subsampling from the constituted suspension: For patients with body weight <10 kg, where an entire sachet cannot be dosed, a NeoMed oral dosing syringe (12 mL) will be used to administer an aliquot of a 25 mg/mL concentration suspension in water or milk, including breast milk. |
| Treatment Duration: | Study duration will be approximately 60 weeks; 4 weeks at Screening, 52 weeks of ataluren treatment, and a 4-week post treatment follow-up. |
| Statistical Methods: | All subjects who receive ≥1 dose of ataluren will be included in the analyses of safety. All subjects who received at least 1 dose of ataluren and had at least 1 PK concentration datum will be included in the PK population. Subject characteristics at study entry will be summarized with frequency tables for categorical variables, and with descriptive statistics as appropriate, for quantitative variables. |

REFERENCES

1. Pichavant C, Aartsma-Rus A, Clemens P R, Davies K E, Dickson G, Takeda S, Wilton S D, Wolff J A, Wooddell C I, Xiao X, Tremblay J P. Current status of pharmaceutical and genetic therapeutic approaches to treat DMD. Mol Ther. 2011 May; 19(5):830-40. doi: 10.1038/mt.2011.59
2. Yiu E M, Kornberg A J. Duchenne muscular dystrophy. J Paediatr Child Health, 2015 August; 51(8):759-64. doi: 10.1111/jpc.12868
3. Birnkrant D J, Bushby K, Bann C M, Apkon S D, Blackwell A, Brumbaugh D, Case L E, Clemens P R, Hadjiyannakis S, Pandya S, Street N, Tomezsko J, Wagner K R, Ward L M, Weber D R; DMD Care Considerations Working Group. Diagnosis and management of Duchenne muscular dystrophy, part 1: diagnosis, and neuromuscular, rehabilitation, endocrine, and gastrointestinal and nutritional management. Lancet Neurol. 2018 March; 17(3):251-267. doi: 10.1016/S1474-4422(18)30024-3
4. Bladen C L, Salgado D, Monges S, Foncuberta M E, Kekou K, Kosma K, et al. The TREAT-NMD DMD Global Database: analysis of more than 7,000 Duchenne muscular dystrophy mutations. Hum Mutat. 2015 April; 36(4): 395-402
5. Bello L, Pegoraro E. Genetic diagnosis as a tool for personalized treatment of Duchenne muscular dystrophy. Acta Myol. 2016 December; 35(3):122-127
6. Aartsma-Rus A, Van Deutekom J C, Fokkema I F, Van Ommen G J, Den Dunnen J T. Entries in the Leiden Duchenne muscular dystrophy mutation database: an overview of mutation types and paradoxical cases that confirm the reading-frame rule. Muscle Nerve. 2006 August; 34(2):135-44
7. Deconinck N, Dan B. Pathophysiology of duchenne muscular dystrophy: current hypotheses. Pediatr Neurol. 2007 January; 36(1):1-7
8. European Medicines Agency. Translarna™ summary of product characteristics, http://www.ema.europa.eu/docs/en GB/document_library/EPAR_-_Product_Information/human/002720/WC500171813.pdf
9. Bushby K, Finkel R, Wong B, et al.; PTC124-GD-007-DMD STUDY GROUP. Ataluren treatment of patients with nonsense mutation dystrophinopathy. Muscle Nerve. 2014 October; 50(4):477-87. doi: 10.1002/mus.24332
10. McDonald C M, Campbell C, Torricelli R E, et al.; Clinical Evaluator Training Group; ACT DMD Study Group. Ataluren in patients with nonsense mutation Duchenne muscular dystrophy (ACT DMD): a multicentre, randomised, double-blind, placebo-controlled, phase 3 trial. Lancet. 2017 Sep. 23; 390(10101):1489-1498. doi: 10.1016/S0140-6736(17)31611-2
11. PTC Therapeutics. 2014. PTC Therapeutics receives conditional approval in the European Union for Translarna™ for the treatment of nonsense mutation Duchenne muscular dystrophy. Available from: http://ir.ptcbio.com/releasedetail.cfm?releaseid=863914
12. Finkel R S, Flanigan K M, Wong B, et al. Phase 2a study of ataluren-mediated dystrophin production in patients with nonsense mutation duchenne muscular dystrophy. PLoS One 2013; 8: e81302
13. McDonald C, Reha A, Elfring G, Peltz S W, Spiegel R. Timed function tests and other physical function outcomes in ataluren-treated patients with nonsense mutation Duchenne muscular dystrophy (nmDMD). Neuromuscul Disord 2014; 24: 861-861. [Abstract T.P.5]
14. Connolly A M, Florence J M, Cradock M M, Malcus E C, Schierbecker J R, Siener C A, et al. Motor and cognitive assessment of infants and young boys with Duchenne muscular dystrophy; Results from the Muscular Dystrophy Association DMD Clinical Research Network. Neuromuscul Disord. 2013 July; 23(7):529-539
15. Merlini L, Sabatelli P. Improving clinical trial design for Duchenne muscular dystrophy. BMC Neurol. 2015 Aug. 26; 15:153
16. US Food and Drug Administration. Duchenne muscular dystrophy and related dystrophinopathies: developing drugs for treatment. Guidance for industry. 2015, http://www.fda.gov/downloads/drugs/guidancecompliance-regulatoryinformation/guidances/UCM450229.pdf
17. Connolly A M, Florence J M, Cradock M M, Eagle M, Flanigan K M, McDonald C M, et al. One-year outcome of boys with Duchenne muscular dystrophy using the Bayley-III scales of infant and toddler development. Pediatr Neurol. 2014 June; 50(6):557-63
18. Mercuri E, Coratti G, Messina S, Ricotti V, Baranello G, D'Amico A, Pera M C, Albamonte E, Sivo S, Mazzone E S, Arnoldi M T, Fanelli L, De Sanctis R, Romeo D M, Vita G L, Battini R, Bertini E, Muntoni F, Pane M. Revised North Star Ambulatory Assessment for Young Boys with Duchenne Muscular Dystrophy. PLoS One. 2016 Aug. 5; 11(8):e0160195. doi: 10.1371/journal.pone.0160195
19. McDonald C M, Henricson E K, Abresch R T, et al. The 6-minute walk test and other endpoints in Duchenne muscular dystrophy: longitudinal natural history observations over 48 weeks from a multicenter study. Muscle Nerve, 2013; 48: 343-56
20. US Food and Drug Administration. General Clinical Pharmacology Considerations for Pediatric Studies for Drugs and Biological Products. Guidance for industry. 2014. https://www.fda.gov/downloads/drugs/guidances/ucm425885.pdf
21. Wang Y Jadhav P R, Lala M, Gobburu J. Clarification on precision criteria to derive sample size when designing pediatric pharmacokinetic studies. J Clin Pharmacol. 2012; 52:1601-1606. 2012
22. Mayhew A G, Cano S J, Scott E, et al. Detecting meaningful change using the north star ambulatory assessment in Duchenne muscular dystrophy. Dev Med Child Neurol. 2013; 55(11):1046-52
23. Institute for Clinical Pharmacodynamics, Inc. Population pharmacokinetic analysis of ataluren in healthy subjects and patients with either nonsense mutations cystic fibrosis or nonsense mutation dystrophinopathy. Final Report. ICPD no. 00321-1. Oct. 20, 2014

It will be appreciated that, although specific aspects described herein have been for purposes of illustration, the description is not to be limited in scope by the specific aspects herein disclosed. These aspects are intended as illustrations of several aspects of the description. Any equivalent aspects are intended to be within the scope of this description. Indeed, various modifications of the description, in addition to those shown and described herein, will become apparent to those skilled in the art from the foregoing description, which modification also intended to be within the scope of this description.

What is claimed is:

1. A method for ameliorating or managing nonsense mutation mediated Duchenne muscular dystrophy (nmDMD) in a human pediatric patient having nmDMD comprising, orally administering to a patient having an age in a range between greater than or equal to six months of age and an age less than two years of age a therapeutically effective amount of ataluren, or a pharmaceutically acceptable salt thereof, based on patient weight to attain an average plasma concentration of the ataluren or pharmaceutically acceptable salt thereof in the patient in a range of at least about 1 μg/mL to about 20 μg/mL during a 24 hour time period; wherein the therapeutically effective amount of the ataluren or pharmaceutically acceptable salt thereof is: (a) 40 mg/kg/day administered as a morning dose of 10 mg/kg, a midday dose of 10 mg/kg, and, an evening dose of 20 mg/kg, or (a) 80 mg/kg/day administered as a morning dose of 20 mg/kg, a midday dose of 20 mg/kg, and, an evening dose of 40 mg/kg.

2. The method of claim 1, wherein the therapeutically effective amount of the ataluren or pharmaceutically acceptable salt thereof is 40 mg/kg/day based on patient weight; and, wherein the average patient plasma concentration of the ataluren or pharmaceutically acceptable salt thereof attained in the patient is in a range of at least about 1 μg/mL to about 20 μg/mL during a 24 hour time period.

3. The method of claim 2, wherein the therapeutically effective amount of 40 mg/kg/day is administered as a morning dose of 10 mg/kg, a midday dose of 10 mg/kg, and, an evening dose of 20 mg/kg; wherein the time period between the morning and midday dose is 6 hours; wherein the time period between the midday and evening dose is 6 hours; and, wherein the time period between the evening dose and the following morning dose is 12 hours.

4. The method of claim 1, wherein the therapeutically effective amount of the ataluren or pharmaceutically acceptable salt thereof is 80 mg/kg/day of based on patient weight; and, wherein the average patient plasma concentration of the ataluren or pharmaceutically acceptable salt thereof attained in the patient is in a range of at least about 1 μg/mL to about 20 μg/mL during a 24 hour time period.

5. The method of claim 4, wherein the therapeutically effective amount of 80 mg/kg/day is administered as a morning dose of 20 mg/kg, a midday dose of 20 mg/kg, and, an evening dose of 40 mg/kg; wherein the time period between the morning and midday dose is 6 hours; wherein the time period between the midday and evening dose is 6 hours; and, wherein the time period between the evening dose and the following morning dose is 12 hours.

6. The method of claim 3, wherein each of the doses are administered within thirty minutes of a meal.

7. The method of claim 5, wherein each of the doses are administered within thirty minutes of a meal.

8. The method of claim 1, wherein the ataluren or pharmaceutically acceptable salt thereof is administered as a free acid of ataluren.

9. The method of claim 1, wherein the ataluren or pharmaceutically acceptable salt thereof is administered as a pharmaceutically acceptable salt of ataluren.

10. The method of claim 9, wherein the pharmaceutically acceptable salt is selected from L-arginine, L-histidine, L-lysine, N-methyl glucamine, magnesium methoxide, potassium hydroxide, sodium hydroxide or tromethamine.

* * * * *